United States Patent
Motoyama

(10) Patent No.: US 12,097,848 B2
(45) Date of Patent: Sep. 24, 2024

(54) MOBILE OBJECT EVACUATION PATH PLANNING APPARATUS, METHOD, AND MEDIUM

(71) Applicant: SONY GROUP CORPORATION, Tokyo (JP)

(72) Inventor: Takuto Motoyama, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 93 days.

(21) Appl. No.: 17/616,776

(22) PCT Filed: Jun. 1, 2020

(86) PCT No.: PCT/JP2020/021542
§ 371 (c)(1),
(2) Date: Dec. 6, 2021

(87) PCT Pub. No.: WO2020/250725
PCT Pub. Date: Dec. 17, 2020

(65) Prior Publication Data
US 2022/0340130 A1  Oct. 27, 2022

(30) Foreign Application Priority Data

Jun. 14, 2019 (JP) ................................ 2019-110794

(51) Int. Cl.
*B60W 30/095* (2012.01)
*G01C 21/00* (2006.01)
(Continued)

(52) U.S. Cl.
CPC ....... *B60W 30/095* (2013.01); *G01C 21/3815* (2020.08); *G06V 10/147* (2022.01);
(Continued)

(58) Field of Classification Search
CPC ..... B60W 30/0095; B60W 2554/4041; B60W 2556/40; G01C 21/3815; G08G 1/0965
See application file for complete search history.

(56) References Cited

U.S. PATENT DOCUMENTS 9,523,984 B1 * 12/2016 Herbach ............... B60W 10/18
10,074,274 B2 * 9/2018 Becker .................. H04W 84/18
(Continued)

FOREIGN PATENT DOCUMENTS

CN    103770730 A    5/2014
CN    106043293 A    10/2016
(Continued)

OTHER PUBLICATIONS

International Search Report and Written Opinion of PCT Application No. PCT/JP2020/021542, issued on Sep. 1, 2020, 12 pages of ISRWO.

(Continued)

*Primary Examiner* — Hussein Elchanti
*Assistant Examiner* — Kenneth M Dunne
(74) *Attorney, Agent, or Firm* — CHIP LAW GROUP

(57) ABSTRACT

There is provided an apparatus and a method that allows appropriate pulling over of a mobile object to a safe road shoulder when an emergency occurs during automated driving. A travelable region available for a vehicle to travel is set like an occupancy map based on distance information from a depth sensor. Image attribute information is generated from an image by semantic segmentation. An evacuation space is set in the travelable region based on the image attribute information that represents the situation of the road surface of the travelable region, and thus an evacuation space map is created.

18 Claims, 20 Drawing Sheets

(51) Int. Cl.
*G06V 10/147* (2022.01)
*G06V 10/22* (2022.01)
*G06V 10/26* (2022.01)
*G06V 20/58* (2022.01)
*G06V 20/70* (2022.01)
*G08G 1/0965* (2006.01)

(52) U.S. Cl.
CPC .............. *G06V 10/22* (2022.01); *G06V 10/26* (2022.01); *G06V 20/58* (2022.01); *G06V 20/70* (2022.01); *G08G 1/0965* (2013.01); *B60W 2420/403* (2013.01); *B60W 2540/01* (2020.02); *B60W 2540/221* (2020.02); *B60W 2540/229* (2020.02); *B60W 2554/4041* (2020.02); *B60W 2556/40* (2020.02); *B60W 2720/106* (2013.01)

(56) References Cited

U.S. PATENT DOCUMENTS

| | | | | |
|---|---|---|---|---|
| 11,577,741 | B1* | 2/2023 | Reschka | B60W 50/045 |
| 2009/0299547 | A1* | 12/2009 | Becker | G01S 17/931 |
| | | | | 701/1 |
| 2013/0338878 | A1 | 12/2013 | Fritz et al. | |
| 2014/0303845 | A1 | 10/2014 | Hartmann et al. | |
| 2016/0086391 | A1* | 3/2016 | Ricci | G06Q 30/06 |
| | | | | 701/29.3 |
| 2017/0126810 | A1* | 5/2017 | Kentley | H04W 4/02 |
| 2017/0371348 | A1* | 12/2017 | Mou | G06V 20/56 |
| 2018/0029604 | A1 | 2/2018 | Niino et al. | |
| 2018/0089505 | A1* | 3/2018 | El-Khamy | H01L 27/146 |
| 2018/0089538 | A1* | 3/2018 | Graham | G06V 20/56 |
| 2018/0147988 | A1* | 5/2018 | Lee | G01C 21/3697 |
| 2018/0197299 | A1 | 7/2018 | Sugita et al. | |
| 2018/0334161 | A1* | 11/2018 | Mizuno | B60W 10/04 |
| 2019/0039613 | A1* | 2/2019 | Lee | G08G 1/167 |
| 2019/0276013 | A1* | 9/2019 | Kim | G06V 20/588 |
| 2020/0094826 | A1* | 3/2020 | Abe | B60Q 1/525 |
| 2020/0159234 | A1* | 5/2020 | Ohara | B60W 30/18154 |
| 2020/0209002 | A1* | 7/2020 | Hou | G07C 5/008 |

FOREIGN PATENT DOCUMENTS

| | | |
|---|---|---|
| CN | 107209999 A | 9/2017 |
| CN | 107798724 A | 3/2018 |
| CN | 109477725 A | 3/2019 |
| CN | 111133489 A | 5/2020 |
| DE | 112016000695 T5 | 10/2017 |
| EP | 3349143 A1 | 7/2018 |
| JP | 2007147440 A | 6/2007 |
| JP | 2009248665 A | 10/2009 |
| JP | 2010-020371 A | 1/2010 |
| JP | 2010-271906 A | 12/2010 |
| JP | 2016-149122 A | 8/2016 |
| JP | 2018-043705 A | 3/2018 |
| JP | 2018-112887 A | 7/2018 |
| JP | 2018-195202 A | 12/2018 |
| WO | 2016/129446 A1 | 8/2016 |
| WO | 2019/026714 A1 | 2/2019 |
| WO | WO-2019069425 A1 | 4/2019 |
| WO | 2019/111702 A1 | 6/2019 |

OTHER PUBLICATIONS

Extended European Search Report of EP Application No. 20822516.9, issued on Jul. 12, 2022, 16 pages.

* cited by examiner

MOBILE OBJECT EVACUATION PATH PLANNING APPARATUS, METHOD, AND MEDIUM

CROSS REFERENCE TO RELATED APPLICATIONS

This application is a U.S. National Phase of International Patent Application No. PCT/JP2020/021542 filed on Jun. 1, 2020, which claims priority benefit of Japanese Patent Application No. JP 2019-110794 filed in the Japan Patent Office on Jun. 14, 2019. Each of the above-referenced applications is hereby incorporated herein by reference in its entirety.

TECHNICAL FIELD

The present disclosure relates to an information processing apparatus, an information processing method, and a program, and more particularly, to an information processing apparatus, an information processing method, and a program that allow for appropriately pulling over to a safe road shoulder when an emergency occurs during automated driving.

BACKGROUND ART

In a case where automated driving is generalized and put into practical use, autonomous traveling is safely performed by, in a normal state, traveling in a traveling lane assumed as a route to a destination while checking a situation of surroundings.

However, in an emergency event in which an emergency vehicle is approaching, it is necessary to safely pull a vehicle body to a roadside zone or the like that is different from a traveling lane, that is, a zone that is normally not for travelling, and clear the traveling lane for the emergency vehicle.

Thus, a technology for safely pulling over a vehicle has been proposed in which, at the time of emergency, a road shoulder is detected, it is determined whether or not the road shoulder is available for pulling over, and the vehicle is pulled over if the road shoulder is available for pulling over (see Patent Document 1).

CITATION LIST

Patent Document

Patent Document 1: Japanese Patent Application Laid-Open No. 2010-020371

SUMMARY OF THE INVENTION

Problems to be Solved by the Invention

However, in the technology of Patent Document 1, although a road shoulder that is available for safely pulling over is searched on the basis of whether there is an obstacle, for example, in a case of a road shoulder provided with a gutter or a road shoulder that is frozen due to accumulated snow or the like, there has been a possibility that the road shoulder is searched as a road shoulder that is available for safely pulling over even though the road shoulder is not available for safely pulling over.

As a result, in the technology described in Patent Document 1, there is a possibility that a road shoulder that may not be available for safely pulling over is regarded and searched as a road shoulder that is available for safely pulling over, and there has been a possibility that an attempt is made to pull over to an unsafe road shoulder when an emergency occurs due to an approaching emergency vehicle.

The present disclosure has been made in view of such a situation, and is particularly aimed at allowing for appropriately pulling over to a safe road shoulder when an emergency occurs during driving.

Solutions to Problems

An information processing apparatus according to one aspect of the present disclosure is an information processing apparatus including: a distance information acquisition unit that acquires distance information; an image acquisition unit that acquires an image; an image attribute recognition unit that recognizes an attribute of each region in the acquired image as image attribute information; and an evacuation space map creation unit that creates an evacuation space map, which is a map constituted by an evacuation space available for a vehicle to safely evacuate, on the basis of the distance information and the image attribute information, in which the evacuation space map creation unit creates the evacuation space map by setting a travelable region available for the vehicle to travel on the basis of the distance information, and setting the evacuation space in the travelable region in accordance with a situation of a road surface of the travelable region based on the image attribute information.

An information processing method and a program according to one aspect of the present disclosure correspond to an information processing apparatus.

In one aspect of the present disclosure, distance information is acquired, an image is acquired, an attribute of each region in the acquired image is recognized as image attribute information, an evacuation space map that is a map constituted by an evacuation space available for a vehicle to safely evacuate is created on the basis of the distance information and the image attribute information, a travelable region available for the vehicle to travel is set on the basis of the distance information, the evacuation space is set in the travelable region in accordance with a situation of a road surface of the travelable region based on the image attribute information, and thus the evacuation space map is created.

MODE FOR CARRYING OUT THE INVENTION

Figure 1:
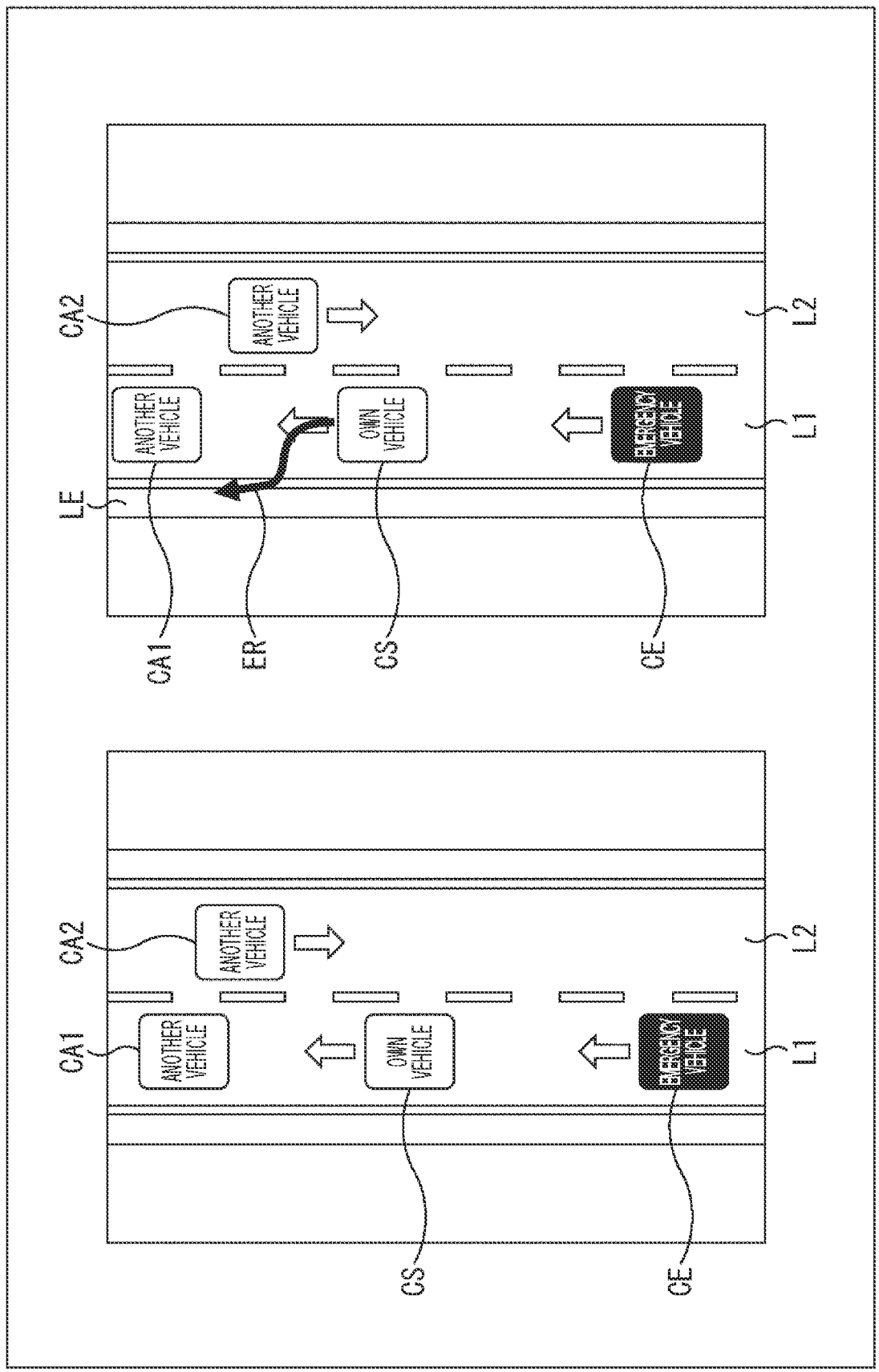
FIG. 1 is a diagram illustrating an operation when an emergency vehicle is approaching, which is an outline of the present disclosure.

Preferred embodiments of the present disclosure will be described below in detail with reference to the accompanying drawings. Note that, in the present specification and drawings, components having substantially the same functional configurations are denoted by the same reference numerals, and the description thereof will thus not be repeated.

Modes for carrying out the present technology will be described below. The description will be made in the order below.

1. Outline of present disclosure
2. Preferred embodiments
3. Example of execution by software 1. Outline of Present Disclosure The present disclosure allows for pulling over to a safe region promptly in a case where an emergency occurs.

First, an outline of the present disclosure will be described with reference to FIG. 1.

Consideration will be given to a case in which, as illustrated in a left part of FIG. 1, an own vehicle CS traveling in a traveling lane L1 by automated driving travels following another vehicle CA1, which is a preceding vehicle, in a direction of an arrow, which is upward in the drawing, for example.

Moreover, it is assumed that another vehicle CA2, which is an oncoming vehicle, is traveling in an oncoming lane L2 on the right side of the traveling lane L1 in the drawing as indicated by a downward arrow in the drawing, and that an emergency vehicle CE is approaching from behind the own vehicle CS.

Note that a vehicle in which a user sits is referred to as the own vehicle CS, and other vehicles are referred to as the other vehicles CA1 and CA2.

At this time, as indicated by a black arrow ER in a right part of FIG. 1, the own vehicle CS traveling by automated driving needs to evacuate so as to clear the traveling lane L1 for the emergency vehicle CE by pulling over to a road shoulder of the traveling lane L1 short of the other vehicle CA1, which is the preceding vehicle.

In performing this series of operations, it is necessary for the own vehicle CS to pull over and enter a road shoulder, which is not the traveling lane L1 where the own vehicle CS is supposed to travel in accordance with traffic rules in a normal state, that is, take an action that deviates from the traffic rules.

Furthermore, in this case, the own vehicle CS searches for a road shoulder on the left side of the traveling lane L1 where the own vehicle CS can safely pull over, and pulls over to the searched road shoulder where safety has been confirmed.

Here, in a case where the own vehicle CS includes a depth sensor such as a LiDAR ("light detection and ranging" or "laser imaging detection and ranging"), a situation of the road shoulder on the left side with respect to a direction in which the own vehicle CS is traveling is detected by a depth sensor, a road shoulder that is available for safely pulling over is searched for on the basis of whether there is an object regarded as an obstacle, an obstacle free region is regarded as a road shoulder that is available for safely pulling over, and the own vehicle CS is pulled over to the road shoulder.

For example, it is assumed that there is provided a LiDAR that irradiates a road shoulder on the left side with infrared laser light from a left side surface of the own vehicle CS, measures a distance to the periphery of the road shoulder in accordance with reflected light, and acquires a depth image.

At this time, in a case where the own vehicle CS detects whether there is an obstacle on the road shoulder on the basis of a depth image constituted by a distance measurement result from the LiDAR, the own vehicle CS may not be able to appropriately detect the situation of the road shoulder even in a case where the road surface can be appropriately detected from the depth image.

Figure 2:
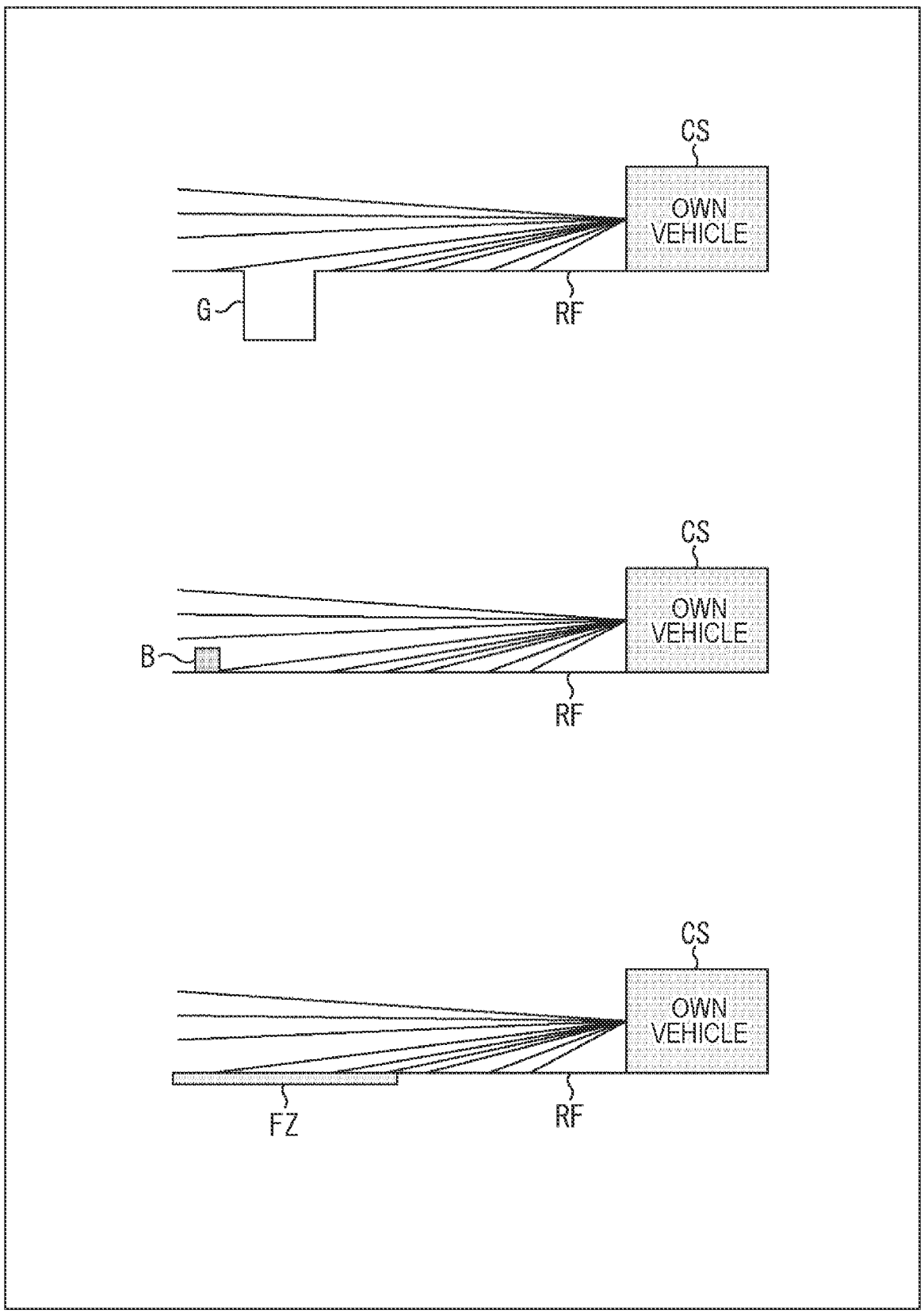
FIG. 2 is a diagram illustrating an example in which a dangerous state of a road surface cannot be appropriately detected by a depth sensor, which is an outline of the present disclosure.

For example, even in a case where a gutter G is provided on a road shoulder on the left side of a road surface RF with respect to a traveling direction of the own vehicle CS in an upper part of FIG. 2, the gutter G existing on the road shoulder may not be detected from the depth image detected by the LiDAR depending on a resolution or an installation position/angle of the LiDAR with respect to the road surface.

Note that FIG. 2 is a diagram in which the infrared laser light emitted by the LiDAR provided in the own vehicle CS is represented by radial straight lines when the own vehicle CS is viewed from a driver's seat of the emergency vehicle CE traveling behind the own vehicle CS.

That is, in a case where the infrared laser light from the LiDAR is emitted toward the left with respect to the traveling direction of the own vehicle CS in the upper part of FIG. 2, in a case where the gutter G is provided on the road shoulder on the left side of the road surface RF, the road surface RF is irradiated with the infrared laser light, so that the road surface RF can be detected.

However, the gutter G may not be irradiated with the infrared laser light from the LiDAR depending on the resolution and incident angle of the infrared laser light as illustrated in the upper part of FIG. 2.

As illustrated in the upper part of FIG. 2, there is a case where a detection result indicating the presence of the gutter G, which actually exists, cannot be obtained in the depth image obtained by the LiDAR, and thus, there has been a possibility that the road shoulder is regarded as a road shoulder that is available for safely pulling over despite the fact that the road shoulder is not available for safely pulling over due to the gutter G.

Furthermore, as illustrated in a middle part of FIG. 2, even in a case where an obstacle B exists on the road shoulder, the obstacle B may fit inside an interval between beams of the infrared laser light due to the resolution of the infrared laser light.

As illustrated in the middle part of FIG. 2, a detection result indicating the presence of the obstacle B, which actually exists, cannot be obtained in the depth image detected by the LiDAR, and thus, there has been a possibility that the road shoulder is regarded as a road shoulder that is available for safely pulling over despite the fact that the road shoulder is not available for safely pulling over due to the obstacle B.

Moreover, as illustrated in a lower part of FIG. 2, in a case where there is no obstacle on the road shoulder that the own vehicle CS may collide with but the road shoulder of the road surface RF has a frozen road surface FZ, it is not possible to recognize from the depth image detected by the LiDAR that the road shoulder has the frozen road surface FZ.

As described above, in the depth image detected by the LiDAR, even in a case where there is actually no obstacle or gutter, there has been a possibility that the road shoulder is regarded as a road shoulder that is available for safely pulling over even though the road shoulder is not available for safely pulling over due to the frozen road surface FZ.

Thus, in the present disclosure, a map constituted by an evacuation space available for safely pulling over is generated as an evacuation space map in chronological order during traveling, and in the event of an emergency, the own vehicle CS is safely pulled over on the basis of the evacuation space map.

Figure 3:
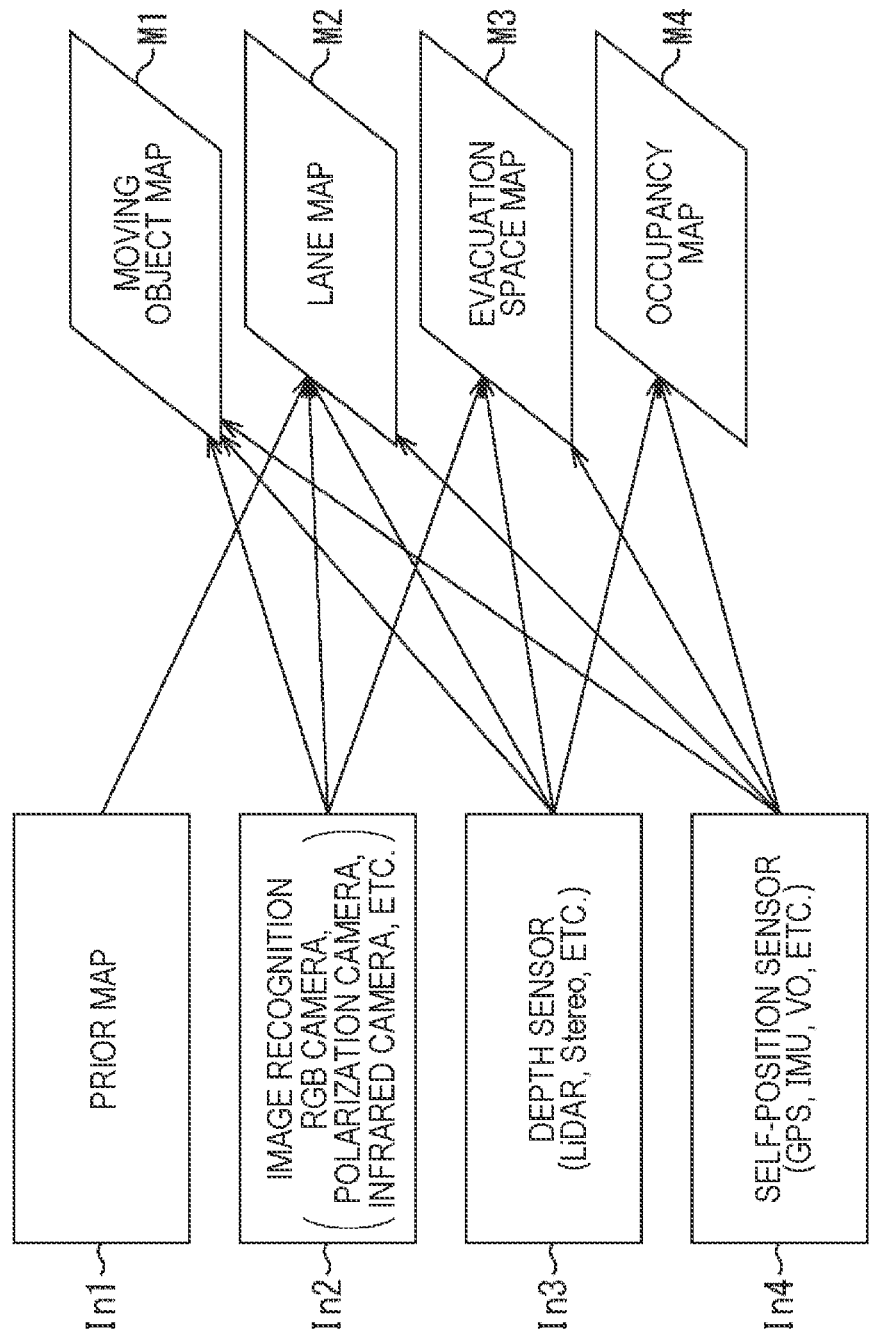
FIG. 3 is a diagram illustrating an evacuation space map, which is an outline of the present disclosure.

Here, the evacuation space map is, for example, as illustrated in FIG. 3, an evacuation space map M3 set between an occupancy map M4 and a lane map M2, among the occupancy map M4, the lane map M2, and a moving object map M1 in an environment map layer structure.

Here, the occupancy map M4 is a map obtained from a depth image In3 obtained by a depth sensor constituted by a LiDAR, a stereo camera, or the like, and self-position information In4 detected by a self-position sensor such as a global positioning system (GPS), an inertial measurement unit (IMU), or a visual odometry (VO).

More specifically, the occupancy map M4 indicates, when viewed from the own vehicle CS, a region where there is an object having a height that may be contacted by the own vehicle CS in a case where the own vehicle CS travels through the region, and the remaining region.

Furthermore, the lane map M2 specifies the position of a lane (traveling lane) in which the vehicle travels, and is obtained from the self-position information In4, the depth image In3, an image recognition result In2 constituted by a result of recognition of an object such as a white line on a road surface in an image captured by an RGB camera, a polarization camera, an infrared camera, or the like, and a prior map In1 indicating the position of the lane.

Moreover, the moving object map M1 indicates a position of a moving object existing around the own vehicle CS in a real-time image obtained from the self-position information In4, the depth image In3, and the image recognition result In2.

That is, automated driving of the own vehicle CS is performed by a control for causing the own vehicle CS to travel in a region where there is no object that may be contacted by the own vehicle CS in a case where the own vehicle CS travels through the region in the occupancy map M4 and there is no moving object on the basis of the position of the moving object obtained from the moving object map M1 in a traveling lane obtained from the lane map M2.

In the present disclosure, as an intermediate layer between the occupancy map M4 and the lane map M2, the evacuation space map M3 is generated, the evacuation space map M3 being constituted by an unavailable-for-evacuation region that is not available for safe evacuation, and an evacuation space (available-for-evacuation region) that is free of objects that may be contacted by the own vehicle CS in a case where the own vehicle CS travels through the region in the occupancy map M4 and is available for safely pulling over in road shoulders on sides of the traveling lane obtained from the lane map M2.

Then, in the event of an emergency, the own vehicle CS is pulled over to the evacuation space available for safely pulling over on the basis of the evacuation space map M3, and this allows for pulling over to a safe evacuation space (road shoulder) when an emergency has occurred.

On the basis of the self-position information In4, the depth image In3, and the image recognition result In2, the evacuation space map M3 indicates an unavailable-for-evacuation region and an available-for-evacuation region (evacuation space), which is an obstacle-free region in the occupancy map M4 and includes a road shoulder or the like that is deviated from the traveling lane (lane) in the lane map M2.

Figure 4:
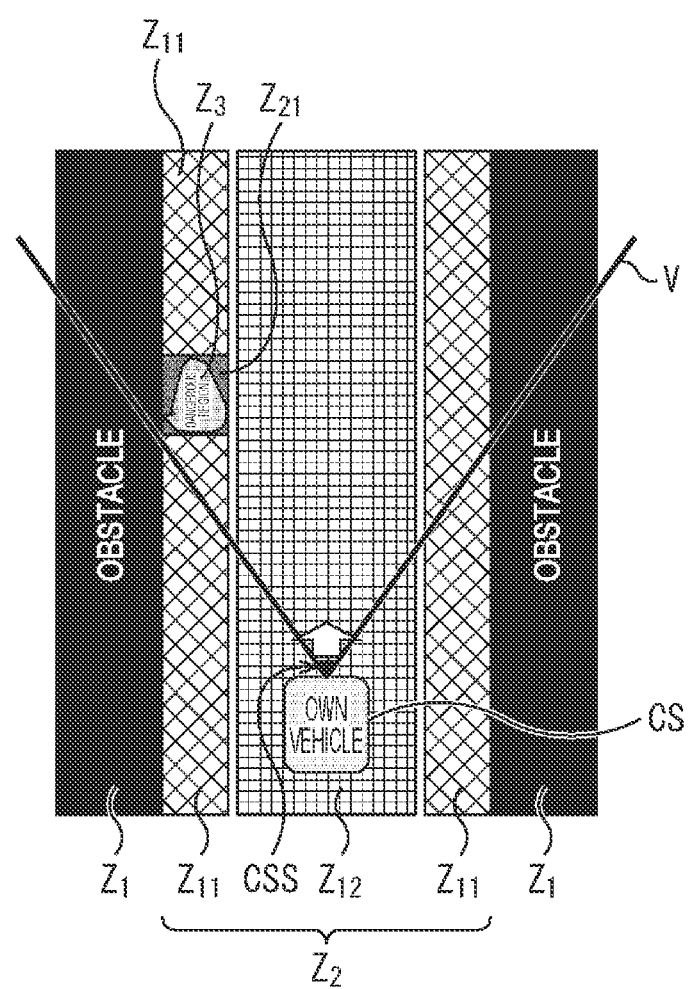
FIG. 4 is a diagram illustrating an evacuation space map, which is an outline of the present disclosure.

More specifically, the evacuation space map M3 is, for example, a map as illustrated in FIG. 4.

In FIG. 4, in regions Z1 on the right and left when viewed from the own vehicle CS in which obstacles exist and the remaining region, which is an obstacle-free region Z2, the available-for-evacuation region is a region constituted by a lane region Z12, which is a traveling lane, and regions Z11 excluding a dangerous region Z3. Therefore, the dangerous region Z3 is an unavailable-for-evacuation region.

At the time of emergency, the own vehicle CS clears, for an emergency vehicle, for example, the lane region Z12, which is a traveling lane, in the available-for-evacuation region constituted by the regions Z11 and Z12, sets an evacuation space that is available for safely pulling over, and pulls over.

Here, in specifying an available-for-evacuation region, on the basis of an image around the own vehicle CS, each of objects in the image is recognized by, for example, semantic segmentation, and a region that is not a dangerous region such as a gutter or a frozen road surface is specified as the available-for-evacuation region.

As described above, in the event of an emergency, a map that indicates the regions Z11 and Z12 constituted by the available-for-evacuation region where the own vehicle CS can safely evacuate is the evacuation space map M3. On the basis of the evacuation space map M3, the own vehicle SC specifies an evacuation space in the available-for-evacuation region in accordance with the situation, and pulls over.

In the present disclosure, the evacuation space map M3 is continuously generated during traveling, and when an emergency occurs, a region available for safely pulling over, in an available-for-evacuation region, is specified as an evacuation space on the basis of information of the generated evacuation space map M3, and the own vehicle is safely pulled over to the specified evacuation space.

As a result, in a case where an emergency occurs, it is possible to pull over the own vehicle to an obstacle free and safe region.

2. Preferred Embodiments

Figure 5:
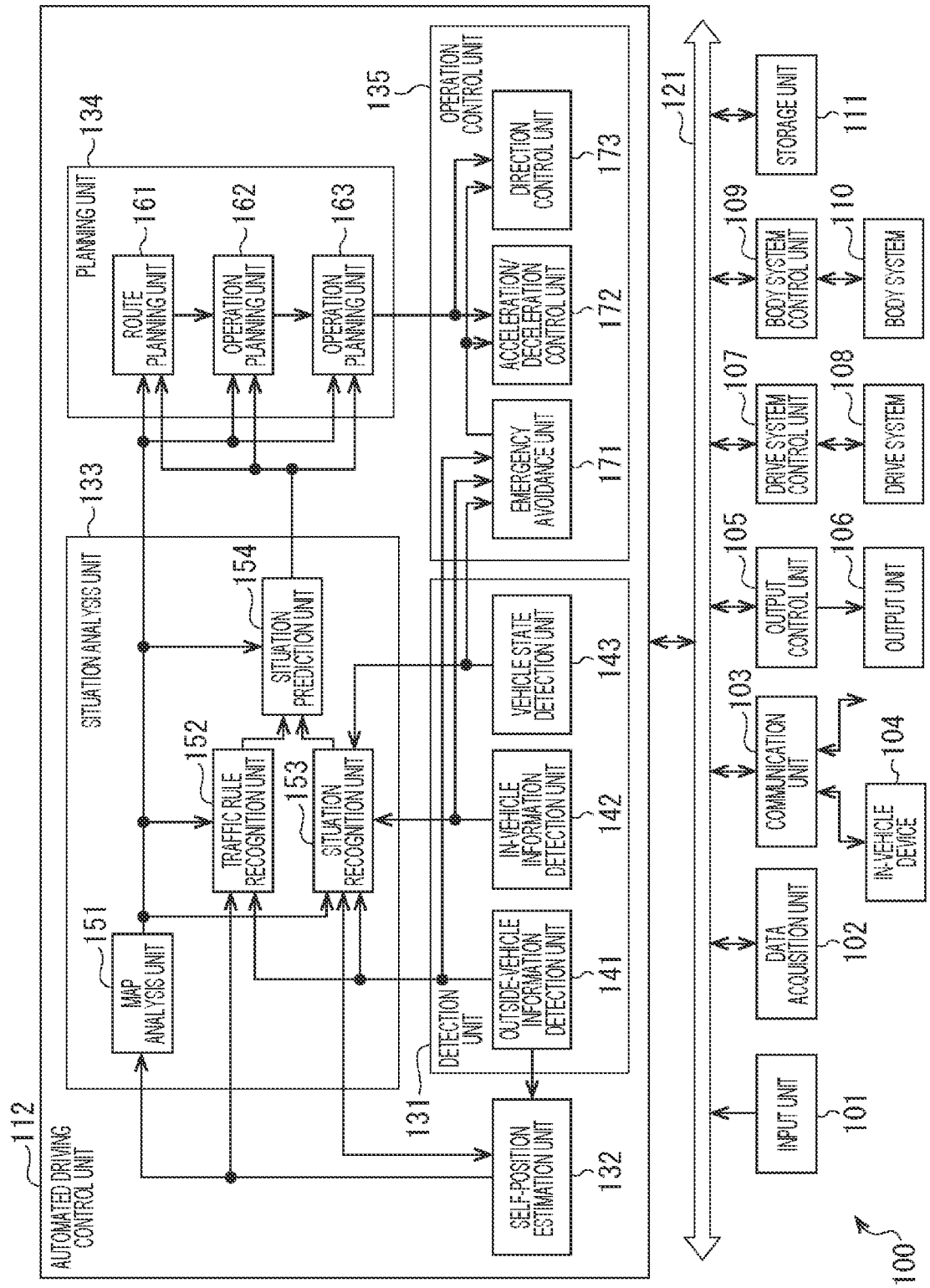
FIG. 5 is a diagram illustrating a configuration example of a vehicle control system to which the present disclosure is applied.

FIG. 5 is a block diagram illustrating a schematic functional configuration example of a vehicle control system 100, which is an example of a mobile object control system to which the present technology can be applied.

Note that, in the following description, a vehicle provided with the vehicle control system 100 is referred to as an own vehicle or a subject vehicle, in distinction from other vehicles. That is, the vehicle provided with the vehicle control system 100 corresponds to the own vehicle SC in FIG. 1, and the other vehicles correspond to the other vehicles CA1 and CA2.

The vehicle control system 100 includes an input unit 101, a data acquisition unit 102, a communication unit 103, an in-vehicle device 104, an output control unit 105, an output unit 106, a drive system control unit 107, a drive system 108, a body system control unit 109, a body system 110, a storage unit 111, and an automated driving control unit 112. The input unit 101, the data acquisition unit 102, the communication unit 103, the output control unit 105, the drive system control unit 107, the body system control unit 109, the storage unit 111, and the automated driving control unit 112 are connected to one another via a communication network 121. The communication network 121 is constituted by, for example, a controller area network (CAN), a local interconnect network (LIN), a local area network (LAN), or a vehicle-mounted communication network or a bus that conforms to an optional standard such as FlexRay (registered trademark). Note that each unit of the vehicle control system 100 may be connected directly, not via the communication network 121.

Note that, in a case where each unit of the vehicle control system 100 performs communication via the communication network 121, description of the communication network 121 will be omitted in the following description. For example, in a case where the input unit 101 and the automated driving control unit 112 communicate with each other via the communication network 121, it is simply described that the input unit 101 and the automated driving control unit 112 communicate with each other.

The input unit 101 includes a device used by an occupant for inputting various types of data, instructions, and the like. For example, the input unit 101 includes an operation device such as a touch panel, a button, a microphone, a switch, or a lever, and an operation device that allows for input by a method other than a manual operation, such as a sound or a gesture. Furthermore, for example, the input unit 101 may be a remote control device using infrared rays or other radio waves, or an external connection device such as a mobile device or a wearable device that supports an operation of the vehicle control system 100. The input unit 101 generates an input signal on the basis of data, an instruction, or the like input by the occupant, and supplies the input signal to each unit of the vehicle control system 100.

The data acquisition unit 102 includes various sensors and the like for acquiring data used for processing by the vehicle control system 100, and supplies the acquired data to each unit of the vehicle control system 100.

For example, the data acquisition unit 102 includes various sensors for detecting a state or the like of the own vehicle. Specifically, for example, the data acquisition unit 102 includes a gyro sensor, an acceleration sensor, an inertial measurement unit (IMU), and a sensor for detecting an operation amount of an accelerator pedal, an operation amount of a brake pedal, a steering angle of a steering wheel, an engine speed, a motor speed, a wheel rotation speed, or the like.

Furthermore, for example, the data acquisition unit 102 includes various sensors for detecting information outside the own vehicle. Specifically, for example, the data acquisition unit 102 includes an imaging device such as a time of flight (ToF) camera, a stereo camera, a monocular camera, an infrared camera, or another camera. Furthermore, for example, the data acquisition unit 102 includes an environment sensor for detecting weather, a meteorological phenomenon, or the like, and a surrounding information detection sensor for detecting an object around the own vehicle. The environment sensor is constituted by, for example, a raindrop sensor, a fog sensor, a sunshine sensor, or a snow sensor. The surrounding information detection sensor is constituted by, for example, an ultrasonic sensor, a radar, a LiDAR ("light detection and ranging" or "laser imaging detection and ranging"), or a sonar.

Moreover, for example, the data acquisition unit 102 includes various sensors for detecting the current position of the own vehicle. Specifically, for example, the data acquisition unit 102 includes a global navigation satellite system (GNSS) receiver or the like that receives a GNSS signal from a GNSS satellite.

Furthermore, for example, the data acquisition unit 102 includes various sensors for detecting in-vehicle information. Specifically, for example, the data acquisition unit 102 includes an imaging device that images a driver, a biosensor that detects biological information of a driver, a microphone that collects sound in a vehicle interior, and the like. The biosensor is provided at, for example, a seat surface or the steering wheel, and detects biological information of an occupant sitting on a seat or a driver gripping the steering wheel.

The communication unit 103 communicates with the in-vehicle device 104, a variety of devices outside the vehicle, a server, a base station, and the like, transmits data supplied from each unit of the vehicle control system 100, and supplies the received data to each unit of the vehicle control system 100. Note that a communication protocol supported by the communication unit 103 is not particularly limited, and the communication unit 103 can support a plurality of types of communication protocols.

For example, the communication unit 103 performs wireless communication with the in-vehicle device 104 by wireless LAN, Bluetooth (registered trademark), near field communication (NFC), wireless USB (WUSB), or the like. Furthermore, for example, the communication unit 103 performs wired communication with the in-vehicle device 104 via a connection terminal (not illustrated) (and, if necessary, a cable) by universal serial bus (USB), high-definition multimedia interface (HDMI) (registered trademark), mobile high-definition link (MHL), or the like.

Moreover, for example, the communication unit 103 communicates with equipment (e.g., an application server or a control server) existing on an external network (e.g., the Internet, a cloud network, or an operator-specific network) via a base station or an access point. Furthermore, for example, the communication unit 103 uses peer-to-peer (P2P) technology to communicate with a terminal existing near the own vehicle (e.g., a terminal of a pedestrian or store, or a machine type communication (MTC) terminal). Moreover, for example, the communication unit 103 performs V2X communication such as vehicle to vehicle communication, vehicle to infrastructure communication, own vehicle to home communication, or vehicle to pedestrian communication. Furthermore, for example, the communication unit 103 includes a beacon reception unit, and receives radio waves or electromagnetic waves transmitted from a wireless station or the like installed on a road to acquire information such as the current position, a traffic congestion, a traffic restriction, or a required time.

The in-vehicle device 104 includes, for example, a mobile device or a wearable device possessed by an occupant, an information device carried in or attached to the own vehicle, and a navigation device that searches for a route to an optional destination.

The output control unit 105 controls output of various types of information to an occupant of the own vehicle or the outside of the vehicle. For example, the output control unit 105 generates an output signal including at least one of visual information (e.g., image data) or auditory information (e.g., audio data), and supplies the output signal to the output unit 106, thereby controlling output of the visual information and the auditory information from the output unit 106. Specifically, for example, the output control unit 105 generates an overhead image, a panoramic image, or the like by synthesis from pieces of image data captured by different imaging devices of the data acquisition unit 102, and supplies an output signal including the generated image to the output unit 106. Furthermore, for example, the output control unit 105 generates audio data containing a warning sound, a warning message, or the like for danger such as collision, contact, or entry into a danger zone, and supplies an output signal containing the generated audio data to the output unit 106.

The output unit 106 includes a device capable of outputting visual information or auditory information to an occupant of the own vehicle or the outside of the vehicle. For example, the output unit 106 includes a display device, an instrument panel, an audio speaker, a headphone, a wearable device such as a glasses-type display worn by an occupant, a projector, a lamp, or the like. The display device included in the output unit 106 may be, other than a device having a normal display, a device that displays visual information in a field of view of a driver, such as a head-up display, a transmissive display, or a device having an augmented reality (AR) display function.

The drive system control unit 107 controls the drive system 108 by generating various control signals and supplying the control signals to the drive system 108. Furthermore, the drive system control unit 107 supplies a control signal to each unit other than the drive system 108 as necessary to give a notification about a control state of the drive system 108 or the like.

The drive system 108 includes various devices related to a drive system of the own vehicle. For example, the drive system 108 includes a driving force generation device for generating a driving force such as an internal combustion engine or a driving motor, a driving force transmission mechanism for transmitting the driving force to wheels, a steering mechanism that adjusts a steering angle, a braking device that generates a braking force, an antilock brake system (ABS), an electronic stability control (ESC), and an electric power steering device.

The body system control unit 109 controls the body system 110 by generating various control signals and supplying the control signals to the body system 110. Furthermore, the body system control unit 109 supplies a control signal to each unit other than the body system 110 as necessary to give a notification about a control state of the body system 110 or the like.

The body system 110 includes various devices of a body system mounted on the vehicle body. For example, the body system 110 includes a keyless entry system, a smart key system, a power window device, a power seat, a steering wheel, an air conditioner, and various lamps (e.g., a head lamp, a back lamp, a brake lamp, a blinker, and a fog lamp).

The storage unit 111 includes, for example, a read only memory (ROM), a random access memory (RAM), a magnetic storage device such as a hard disc drive (HDD), a semiconductor storage device, an optical storage device, and a magneto-optical storage device. The storage unit 111 stores various programs, data, and the like used by each unit of the vehicle control system 100. For example, the storage unit 111 stores map data such as a three-dimensional high definition map such as a dynamic map, a global map that is less accurate than the high definition map and covers a wider area, and a local map that contains information about surroundings of the own vehicle.

The automated driving control unit 112 performs control related to automated driving such as autonomous traveling or driving support. Specifically, for example, the automated driving control unit 112 performs cooperative control for the purpose of implementing functions of an advanced driver assistance system (ADAS) including collision avoidance or shock mitigation of the own vehicle, follow-up traveling based on an inter-vehicle distance, vehicle speed maintaining traveling, warning for collision of the own vehicle, or warning for lane departure of the own vehicle. Furthermore, for example, the automated driving control unit 112 performs cooperative control for the purpose of automated driving in which the vehicle autonomously travels without depending on an operation of a driver or the like. The automated driving control unit 112 includes a detection unit 131, a self-position estimation unit 132, a situation analysis unit 133, a planning unit 134, and an operation control unit 135.

The detection unit 131 detects various types of information necessary for control for automated driving. The detection unit 131 includes an outside-vehicle information detection unit 141, an in-vehicle information detection unit 142, and a vehicle state detection unit 143.

The outside-vehicle information detection unit 141 performs processing of detecting information outside the own vehicle on the basis of data or a signal from each unit of the vehicle control system 100. For example, the outside-vehicle information detection unit 141 performs detection processing, recognition processing, and tracking processing for an object around the own vehicle, and processing for detecting a distance to the object. Examples of the object to be detected include a vehicle, a person, an obstacle, a structure, a road, a traffic light, a traffic sign, and a road marking. Furthermore, for example, the outside-vehicle information detection unit 141 performs processing of detecting a surrounding environment of the own vehicle. Examples of the surrounding environment to be detected include the weather, temperature, humidity, brightness, and the state of the road surface. The outside-vehicle information detection unit 141 supplies data indicating a result of the detection processing to the self-position estimation unit 132, a map analysis unit 151, a traffic rule recognition unit 152, and a situation recognition unit 153 of the situation analysis unit 133, an emergency avoidance unit 171 of the operation control unit 135, and the like.

The in-vehicle information detection unit 142 performs processing of detecting in-vehicle information on the basis of data or a signal from each unit of the vehicle control system 100. For example, the in-vehicle information detection unit 142 performs driver authentication processing and recognition processing, driver's state detection processing, occupant detection processing, in-vehicle environment detection processing, and the like. Examples of the driver's state to be detected include a physical condition, a wakefulness level, a concentration level, a fatigue level, and a line-of-sight direction. Examples of the in-vehicle environment to be detected include the temperature, humidity, brightness, and odor. The in-vehicle information detection unit 142 supplies data indicating a result of the detection processing to the situation recognition unit 153 of the situation analysis unit 133, the emergency avoidance unit 171 of the operation control unit 135, and the like.

The vehicle state detection unit 143 performs processing of detecting the state of the own vehicle on the basis of data or a signal from each unit of the vehicle control system 100. Examples of the state of the own vehicle to be detected include a speed, an acceleration, a steering angle, presence or absence and contents of abnormality, a state of driving operation, a position and inclination of a power seat, a state of door lock, and states of other vehicle-mounted devices. The vehicle state detection unit 143 supplies data indicating a result of the detection processing to the situation recognition unit 153 of the situation analysis unit 133, the emergency avoidance unit 171 of the operation control unit 135, and the like.

The self-position estimation unit 132 performs processing of estimating the position, posture, and the like of the own vehicle on the basis of data or a signal from each unit of the vehicle control system 100 such as the outside-vehicle information detection unit 141 and the situation recognition unit 153 of the situation analysis unit 133. Furthermore, the self-position estimation unit 132 generates a local map (hereinafter referred to as a self-localization map) used for estimating the self-position as necessary. The self-localization map is, for example, a highly accurate map using a technology such as simultaneous localization and mapping (SLAM). The self-position estimation unit 132 supplies data indicating a result of the estimation processing to the map analysis unit 151, the traffic rule recognition unit 152, and the situation recognition unit 153 of the situation analysis unit 133, and the like. Furthermore, the self-position estimation unit 132 stores the self-localization map in the storage unit 111.

The situation analysis unit 133 performs processing of analyzing the situation of the own vehicle and the surroundings. The situation analysis unit 133 includes the map analysis unit 151, the traffic rule recognition unit 152, the situation recognition unit 153, and a situation prediction unit 154.

The map analysis unit 151 performs processing of analyzing various maps stored in the storage unit 111 while using data or a signal from each unit of the vehicle control system 100 such as the self-position estimation unit 132 and the outside-vehicle information detection unit 141 as necessary, and constructs a map that contains information necessary for processing of automated driving. The map analysis unit 151 supplies the constructed map to, for example, the traffic rule recognition unit 152, the situation recognition unit 153, the situation prediction unit 154, and a route planning unit 161, an action planning unit 162, and an operation planning unit 163 of the planning unit 134.

The traffic rule recognition unit 152 performs processing of recognizing traffic rules around the own vehicle on the basis of data or a signal from each unit of the vehicle control system 100 such as the self-position estimation unit 132, the outside-vehicle information detection unit 141, and the map analysis unit 151. By this recognition processing, for example, the position and state of a signal around the own vehicle, contents of traffic regulations around the own vehicle, a lane available for traveling, and the like are recognized. The traffic rule recognition unit 152 supplies data indicating a result of the recognition processing to the situation prediction unit 154 or the like.

The situation recognition unit 153 performs processing of recognizing a situation related to the own vehicle on the basis of data or a signal from each unit of the vehicle control system 100 such as the self-position estimation unit 132, the outside-vehicle information detection unit 141, the in-vehicle information detection unit 142, the vehicle state detection unit 143, and the map analysis unit 151. For example, the situation recognition unit 153 performs processing of recognizing a situation of the own vehicle, a situation around the own vehicle, a situation of a driver of the own vehicle, and the like. Furthermore, the situation recognition unit 153 generates a local map (hereinafter referred to as a situation recognition map) used for recognition of the situation around the own vehicle as necessary. The situation recognition map is, for example, an occupancy grid map.

Examples of the situation of the own vehicle to be recognized include the position, posture, and movement (e.g., speed, acceleration, and moving direction) of the own vehicle, and the presence or absence and contents of abnormality. Examples of the situation around the own vehicle to be recognized include the type and position of a stationary object in the surroundings, the type, position, and movement (e.g., speed, acceleration, and moving direction) of a moving object in the surroundings, a configuration of a road in the surroundings and the state of the road surface, and the weather, temperature, humidity, and brightness in the surroundings. Examples of the driver's state to be recognized include a physical condition, a wakefulness level, a concentration level, a fatigue level, a line-of-sight movement, and a driving operation.

The situation recognition unit 153 supplies data (containing a situation recognition map as necessary) indicating a result of the recognition processing to the self-position estimation unit 132, the situation prediction unit 154, and the like. Furthermore, the situation recognition unit 153 stores the situation recognition map in the storage unit 111.

The situation prediction unit 154 performs processing of predicting a situation related to the own vehicle on the basis of data or a signal from each unit of the vehicle control system 100 such as the map analysis unit 151, the traffic rule recognition unit 152, and the situation recognition unit 153. For example, the situation prediction unit 154 performs processing of predicting the situation of the own vehicle, the situation around the own vehicle, the situation of the driver, and the like.

Examples of the situation of the own vehicle to be predicted include behavior of the own vehicle, occurrence of abnormality, and mileage. Examples of the situation around the own vehicle to be predicted include a behavior of a moving object around the own vehicle, a change in state of a signal, and a change in environment such as weather. Examples of the situation of the driver to be predicted include a behavior and a physical condition of a driver.

The situation prediction unit 154 supplies data indicating a result of the prediction processing, together with data from the traffic rule recognition unit 152 and the situation recognition unit 153, to the route planning unit 161, the action planning unit 162, and the operation planning unit 163 of the planning unit 134, and the like.

The route planning unit 161 plans a route to a destination on the basis of data or a signal from each unit of the vehicle control system 100 such as the map analysis unit 151 and the situation prediction unit 154. For example, the route planning unit 161 sets a route from the current position to a designated destination on the basis of a global map. Furthermore, for example, the route planning unit 161 changes, as appropriate, the route on the basis of a situation such as a traffic congestion, an accident, a traffic restriction, or construction, and a physical condition of the driver. The route planning unit 161 supplies data indicating the planned route to the action planning unit 162 or the like.

The action planning unit 162 plans an action of the own vehicle for safely traveling the route planned by the route planning unit 161 within a planned time on the basis of data or a signal from each unit of the vehicle control system 100 such as the map analysis unit 151 and the situation prediction unit 154. For example, the action planning unit 162 plans starting, stopping, a traveling direction (e.g., forward movement, backward movement, left turn, right turn, or change of direction), a traveling lane, a traveling speed, overtaking, and the like. The action planning unit 162 supplies data indicating the planned action of the own vehicle to the operation planning unit 163 or the like.

The operation planning unit 163 plans an operation of the own vehicle for implementing the action planned by the action planning unit 162 on the basis of data or a signal from each unit of the vehicle control system 100 such as the map analysis unit 151 and the situation prediction unit 154. For example, the operation planning unit 163 plans acceleration, deceleration, a travelling track, and the like. The operation planning unit 163 supplies data indicating the planned operation of the own vehicle to an acceleration/deceleration control unit 172 and a direction control unit 173 of the operation control unit 135, and the like.

The operation control unit 135 controls the operation of the own vehicle. The operation control unit 135 includes the emergency avoidance unit 171, the acceleration/deceleration control unit 172, and the direction control unit 173.

The emergency avoidance unit 171 performs processing of detecting an emergency such as collision, contact, entry into a danger zone, abnormality of the driver, or abnormality of the vehicle on the basis of results of detection by the outside-vehicle information detection unit 141, the in-vehicle information detection unit 142, and the vehicle state detection unit 143. In a case where occurrence of an emergency has been detected, the emergency avoidance unit 171 plans an operation of the own vehicle for avoiding an emergency, such as a sudden stop or a sudden turn.

The emergency avoidance unit 171 supplies data indicating the planned operation of the own vehicle to the acceleration/deceleration control unit 172, the direction control unit 173, and the like.

The acceleration/deceleration control unit 172 performs acceleration/deceleration control for implementing the operation of the own vehicle planned by the operation planning unit 163 or the emergency avoidance unit 171. For example, the acceleration/deceleration control unit 172 calculates a control target value of the driving force generation device or the braking device for implementing planned acceleration, deceleration, or sudden stop, and supplies a control command indicating the calculated control target value to the drive system control unit 107.

The direction control unit 173 performs direction control for implementing the operation of the own vehicle planned by the operation planning unit 163 or the emergency avoidance unit 171. For example, the direction control unit 173 calculates a control target value of the steering mechanism for implementing a travelling track or sudden turn planned by the operation planning unit 163 or the emergency avoidance unit 171, and supplies a control command indicating the calculated control target value to the drive system control unit 107.

<Configuration Example in which Evacuation Space Map is Generated so that Evacuation Space is Specified and Vehicle is Pulled Over in Event of Emergency>

Figure 6:
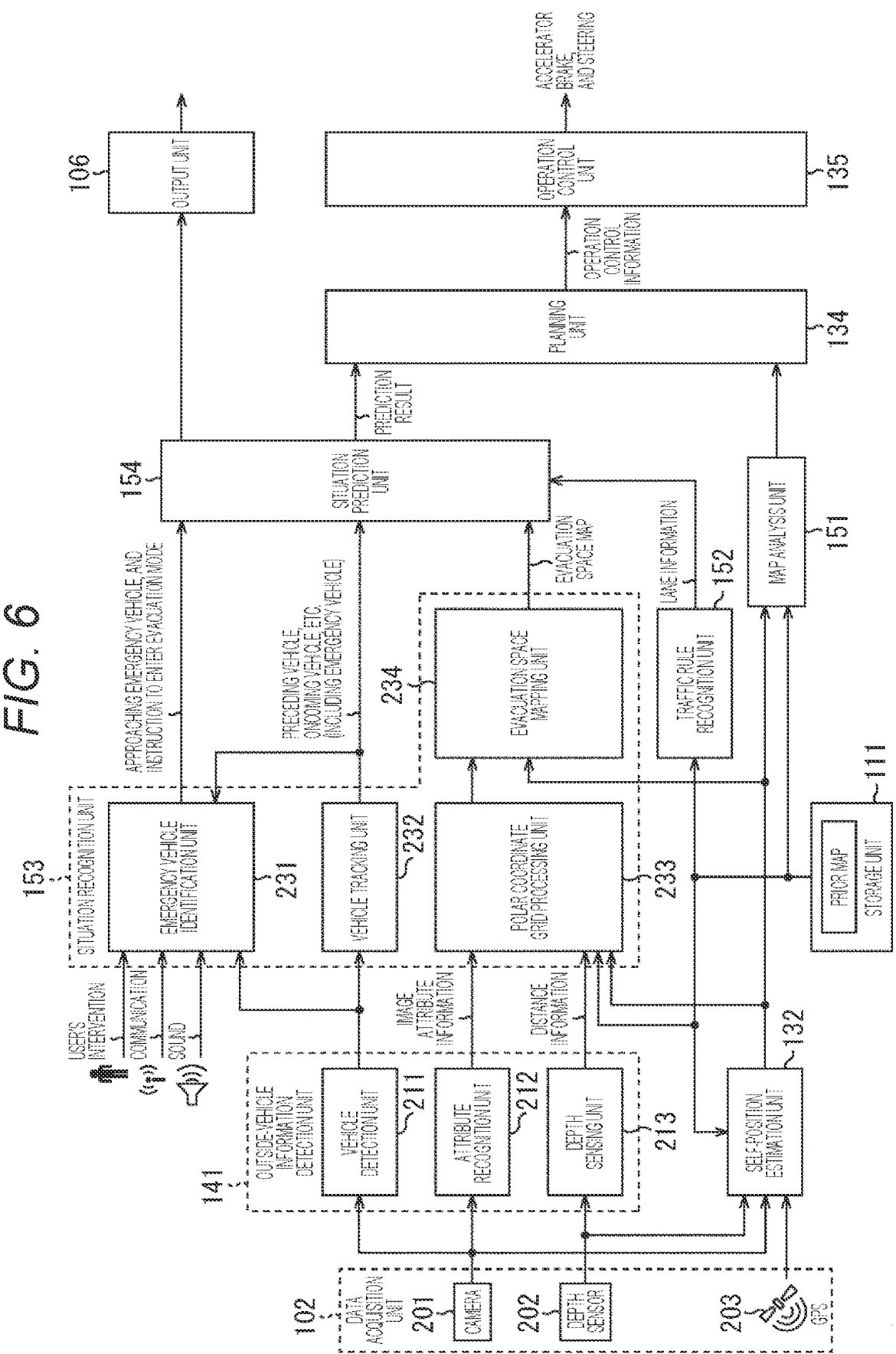
FIG. 6 is a diagram illustrating a configuration example, which is a portion of generating an evacuation space map of the present disclosure extracted from the configuration example of the vehicle control system in FIG. 5.

Next, with reference to FIG. 6, a configuration extracted from the vehicle control system 100 in FIG. 5 will be described, in which an evacuation space map is generated, and in the event of an emergency, an evacuation space is specified on the basis of the evacuation space map, and the vehicle is pulled over.

A configuration for generating an evacuation space map, specifying an evacuation space on the basis of the evacuation space map in the event of an emergency, and pulling over the vehicle is constituted by the data acquisition unit 102, the output unit 106, the storage unit 111, and the outside-vehicle information detection unit 141 of the detection unit 131, the self-position estimation unit 132, the map analysis unit 151, the traffic rule recognition unit 152, and the situation recognition unit 153 of the situation analysis unit 133, the planning unit 134, and the operation control unit 135 in the automated driving control unit 112.

The data acquisition unit 102 includes, for example, a camera 201, a depth sensor 202, and a GPS 203.

The camera 201 is constituted by, for example, an RGB camera or a polarization camera, captures an image of the surroundings of the own vehicle including at least the direction in which the own vehicle is traveling, and outputs the captured image to the outside-vehicle information detection unit 141 and the self-position estimation unit 132.

The depth sensor 202 is constituted by, for example, a LiDAR or a stereo camera, detects, in units of pixels, information regarding a distance to an object around the own vehicle including at least the direction in which the own vehicle is traveling, and outputs a depth image, which is a detection result, to the outside-vehicle information detection unit 141 and the self-position estimation unit 132.

The GPS 203 receives a signal from a satellite (not illustrated), determines the position of the own vehicle constituted by latitude and longitude on the earth, and outputs a result of the position determination to the self-position estimation unit 132.

The outside-vehicle information detection unit 141 detects various types of outside-vehicle information on the basis of the image, the depth image, and the result of the position determination respectively supplied from the camera 201, the depth sensor 202, and the GPS 203 of the data acquisition unit 102, and outputs the detected information to the situation recognition unit 153.

More specifically, the outside-vehicle information detection unit 141 includes a vehicle detection unit 211, an attribute recognition unit 212, and a depth sensing unit 213.

The vehicle detection unit 211 performs image recognition based on an image (including a two-dimensional image and a stereo image) captured by the camera 201 to detect a region of a vehicle in the image, and outputs a detection result indicating the region of the vehicle to the situation recognition unit 153.

The attribute recognition unit 212 performs object recognition processing such as semantic segmentation in which learning is performed with the use of, for example, deep learning on an image (including a two-dimensional image and a stereo image) captured by the camera 201, recognizes an object to which each region in the image in units of pixels belongs, and outputs a recognition result to the situation recognition unit 153 as image attribute information.

For example, on the basis of the image attribute information, the attribute recognition unit 212 includes, in the image attribute information, a safe region where the own vehicle can travel safely and a region where the own vehicle cannot travel safely or a region where traveling should be avoided, which is recognized as a dangerous region, and then outputs the image attribute information.

More specifically, in a case where a gutter, an object (such as a fallen object) having a height that may be collided with, a frozen road surface, and the like are detected in the image attribute information, the attribute recognition unit 212 generates the image attribute information by adding attribute information indicating that these regions are dangerous regions in addition to attribute information in units of pixels.

For example, in a case where the camera 201 is a polarization camera, the attribute recognition unit 212 recognizes a frozen portion or the like by deep learning on an image obtained by removing a specular reflection portion on the road surface, for example, on the basis of a polarization image captured by the polarization camera, regards the frozen portion or the like as a dangerous region, and generates image attribute information.

Furthermore, for example, in a case where the camera 201 is an infrared light camera, the attribute recognition unit 212 recognizes a puddle, a frozen portion, or the like on the road surface by infrared reflectance in a wavelength band in which water and ice are absorbed, for example, on the basis of an infrared light image captured by the infrared light camera, regards the puddle, the frozen portion, or the like as a dangerous region, and generates image attribute information.

The depth sensing unit 213 generates distance information in units of pixels corresponding to an image in the camera 201 on the basis of information of a depth image supplied from the depth sensor 202, and outputs the distance information to the situation recognition unit 153.

The self-position estimation unit 132 estimates a highly accurate self-position and posture on the basis of an image supplied from the camera 201, a depth image supplied from the depth sensor 202, self-position information constituted by latitude and longitude supplied from the GPS 203, and information of a prior map stored in the storage unit 111.

Then, the self-position estimation unit 132 outputs information regarding the self-position and posture, which is an estimation result, to the map analysis unit 151, the traffic rule recognition unit 152, and the situation recognition unit 153.

The situation recognition unit 153 specifies an approaching emergency vehicle on the basis of a vehicle detection result, outputs an instruction to enter an evacuation mode to the output unit 106, and displays the instruction on a speaker, a display, or the like.

Furthermore, on the basis of the vehicle detection result, the image attribute information, and the distance information, the situation recognition unit 153 generates and outputs, to the planning unit 134, information regarding a preceding vehicle and an oncoming vehicle including an emergency vehicle, and an evacuation space map.

More specifically, the situation recognition unit 153 includes an emergency vehicle identification unit 231, a vehicle tracking unit 232, a polar coordinate grid processing unit 233, and an evacuation space mapping unit 234.

The emergency vehicle identification unit 231 identifies whether an emergency vehicle is approaching on the basis of at least one of information regarding a region of a vehicle in an image supplied from the vehicle detection unit 211, information regarding wireless communication used by an emergency vehicle in the periphery, sound of a warning sound emitted by the emergency vehicle, or information indicating that an emergency vehicle is approaching sent from or input by a user. In a case where an approaching emergency vehicle is recognized, information indicating that an emergency vehicle is approaching and information for giving an instruction to enter an evacuation mode are output to the situation prediction unit 154.

In a case where the information indicating that an emergency vehicle is approaching and the information for giving an instruction to enter an evacuation mode are supplied from the emergency vehicle identification unit 231, the situation prediction unit 154 outputs, to the output unit 106, the information indicating that an emergency vehicle is approaching and the information for giving an instruction to enter an evacuation mode on the basis of the supplied information.

In response to this, the output unit 106 presents, to a driver who is driving the own vehicle, information indicating that an emergency vehicle is approaching and information indicating that an instruction to enter an evacuation mode has been given, by an image or a sound by using a speaker, a display, or the like.

The vehicle tracking unit 232 acquires, in chronological order, information regarding a region of a vehicle in an image supplied from the vehicle detection unit 211, tracks movements of all preceding vehicles and oncoming vehicles including an emergency vehicle, and outputs a tracking result to the situation prediction unit 154.

The polar coordinate grid processing unit 233 performs polar coordinate grid processing on the basis of image attribute information, distance information, a prior map, and information regarding the self-position and posture, which is a self-position estimation result, generates an evacuation space map, and outputs the generated evacuation space map to the evacuation space mapping unit 234.

Here, in the polar coordinate grid processing, first, the polar coordinate grid processing unit 233 sets, as a polar coordinate grid, a grid in a polar coordinate system centered on the position of the own vehicle on the basis of the image attribute information, the distance information, the prior map, and the information regarding the self-position and posture, which is a self-position estimation result.

Then, the polar coordinate grid processing unit 233 sets an untravelable region where an obstacle exists and the remaining region, which is a travelable region, on the basis of the distance information in units of horizontal regions in a polar coordinate grid to be described later.

Moreover, on the basis of the image attribute information, the polar coordinate grid processing unit 233 sets an available-for-evacuation region constituted by a region of a traveling lane and a space that is outside the traveling lane but is a road shoulder or the like and is available for safe evacuation in the travelable region, and sets a dangerous region (unavailable-for-evacuation region) that is neither available for traveling nor evacuation.

Then, the polar coordinate grid processing unit 233 generates an evacuation space map constituted by the untravelable region, the available-for-evacuation region, and the dangerous region (unavailable-for-evacuation region) in chronological order in units of horizontal regions in the polar coordinate grid.

Note that the polar coordinate grid processing will be described later in detail with reference to FIGS. 7 to 13.

The evacuation space mapping unit 234 expands and stores the evacuation space map by accumulating over time the evacuation space maps generated in chronological order by the polar coordinate grid processing unit 233, and outputs the evacuation space map to the situation prediction unit 154 in an evacuation mode.

That is, the evacuation space mapping unit 234 accumulates over time the evacuation space maps sequentially generated in chronological order by the polar coordinate grid processing unit 233 to generate a wide-area evacuation space map that covers a wider range, and outputs the wide-area evacuation space map to the planning unit 134 via the situation prediction unit 154 in an evacuation mode.

When the information indicating that an emergency vehicle is approaching, the information for giving an instruction to enter an evacuation mode, the tracking information of all preceding vehicles and oncoming vehicles including an emergency vehicle, the evacuation space map, and lane information, which is information regarding the position of the traveling lane supplied from the traffic rule recognition unit 152 are acquired, the situation prediction unit 154 outputs these pieces of information to the planning unit 134 as a situation prediction result.

The traffic rule recognition unit 152 performs processing of recognizing traffic rules around the own vehicle on the basis of the information of the prior map stored in the storage unit 111 and detailed information regarding the self-position and posture, which is a self-position estimation result, and outputs, to the situation prediction unit 154, the position and state of a signal around the own vehicle, contents of traffic regulations around the own vehicle, and lane information indicating a lane available for traveling, for example.

When the detailed information regarding the self-position and posture, which is a self-position estimation result, is acquired from the self-position estimation unit 132, the map analysis unit 151 generates map information necessary for planning a route of automated driving on the basis of the prior map stored in the storage unit 111, and outputs the map information to the planning unit 134.

The planning unit 134 plans a route to a destination, generates operation control information required for traveling the planned route, and outputs the operation control information to the operation control unit 135.

At this time, in a case where information for giving an instruction to enter an evacuation mode is supplied from the situation prediction unit 154, the planning unit 134 searches for an evacuation space on the basis of information of the evacuation space map supplied together, generates operation control information for safely pulling over the vehicle to the searched evacuation space, and outputs the operation control information to the operation control unit 135.

The operation control unit 135 controls an accelerator, a brake, a steering, and the like of the own vehicle on the basis of the operation control information supplied from the planning unit 134 to cause the own vehicle to travel the planned route to the destination, and cause the own vehicle to safely pull over to the evacuation space planned on the basis of the evacuation space map when an instruction to enter an evacuation mode is given.

<Evacuation Space Map>

Next, the evacuation space map generated in chronological order will be described with reference to FIG. 7.

Consideration will be given to a case in which, as illustrated in a left part of FIG. 7, the own vehicle SC is traveling upward in the drawing, for example.

Figure 7:
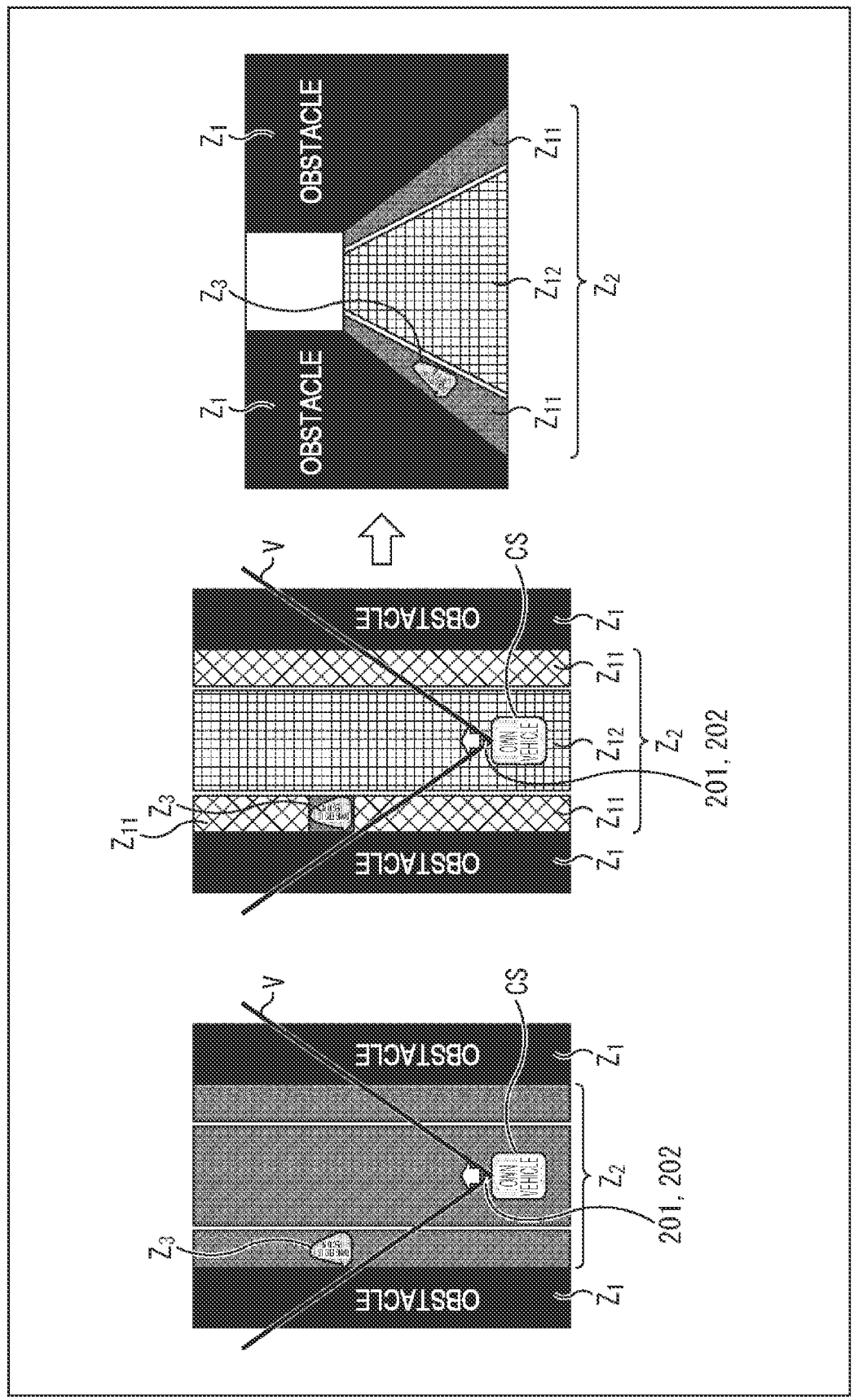
FIG. 7 is a diagram illustrating an example of an evacuation space map corresponding to an actual state of the periphery of the vehicle.

In the left part of FIG. 7, there are regions Z1, which are untravelable regions where obstacles having a height that may cause a collision when the own vehicle SC travels exist, on both sides of the own vehicle SC, and the remaining region Z2 is a travelable region.

Furthermore, in the region Z2, an area between recognized white lines or the like on the road is recognized as a traveling lane by object recognition such as semantic segmentation.

Here, on the road shoulder on the left side of the traveling lane in the left part of FIG. 7, it is assumed that there is a region Z3 constituted by a frozen road surface, a depression, or the like where it is dangerous to travel.

In a travel mode (hereinafter also referred to as a normal mode) for travelling a route to a destination, a traveling lane is recognized, so that a route is planned within a range not departing from the traveling lane, and travel by automated driving is implemented.

Thus, in a normal mode, the automated driving can be continued as long as the information illustrated in the left part of FIG. 7 is obtained. The automated driving is not particularly affected by the region Z3 that may be dangerous to travel as long as the vehicle is traveling in the traveling lane.

However, for example, in a case where an emergency vehicle is approaching from behind the own vehicle SC, the own vehicle SC needs to be pulled over to a safe region such as a road shoulder outside of the traveling lane to evacuate so as to clear the traveling lane for the emergency vehicle.

Note that a travel mode in which the vehicle is pulled over to a safe region such as a road shoulder outside of the traveling lane to evacuate so as to clear the traveling lane for the emergency vehicle as described above is hereinafter also referred to as an evacuation mode.

That is, in a case of the evacuation mode, unlike a case of the normal mode, the vehicle needs to depart from the traveling lane and then pull over.

Thus, in order to implement the evacuation mode, as illustrated in a central part of FIG. 7, it is necessary to set, in a travelable region Z2, an available-for-evacuation region constituted by regions Z11 indicating evacuation spaces available for safe evacuation, and a dangerous region (unavailable-for-evacuation region) Z3 that is not available for safe evacuation, in addition to a lane region Z12, which is a traveling lane.

That is, as illustrated in the central part of FIG. 7, the evacuation space map is a map in which, in the travelable region Z2, an available-for-evacuation region constituted by the lane region Z12, which is a traveling lane, and the regions Z11 indicating evacuation spaces available for safe evacuation, and the dangerous region (unavailable-for-evacuation region) Z3 that is not available for safe evacuation are set.

Note that the evacuation space map in the central part of FIG. 7 corresponds to the evacuation space map in FIG. 4 described above.

In a case where a situation as indicated by the evacuation space map illustrated in the central part of FIG. 7 actually exists, an image captured in a field of view V of the camera

201 at the center of a driver's seat of the own vehicle SC in the drawing is, for example, an image as illustrated in a right part of FIG. 7.

That is, in the right part of FIG. 7, the obstacle regions (untravelable regions) Z1 such as walls exist on the right and left in the field of view V, and the travelable region Z2 is provided therebetween. Furthermore, the region Z12 constituted by a traveling lane in the center of the travelable region Z2 and the evacuation space regions Z11 available for safe evacuation in the road shoulders outside the region Z12 are set as the available-for-evacuation region. Moreover, in the regions Z11, a region that is not available for safe evacuation due to the presence of an obstacle, a gutter, or the like is set as the dangerous region (unavailable-for-evacuation region) Z3.

The evacuation space map is constituted by an available-for-evacuation region constituted by a region including the region Z12 constituted by a traveling lane and a region excluding the dangerous region (unavailable-for-evacuation region) Z3 in the evacuation space regions Z11, and the dangerous region (unavailable-for-evacuation region) Z3.

For example, when an image as illustrated in the right part of FIG. 7 is captured in the field of view V in the left part and central part of FIG. 7, it is recognized that an obstacle exists in the regions Z1 in the image by object recognition processing such as semantic segmentation.

Furthermore, a traveling lane available for both traveling and evacuation is recognized in the region Z12, road shoulders available for evacuation are recognized in the regions Z11, and a combination of the regions Z11 and Z12 is recognized as an available-for-evacuation region.

Moreover, the dangerous region (unavailable-for-evacuation region) Z3 that may be dangerous to travel and is not available for evacuation is recognized.

That is, when an image as illustrated in the left part of FIG. 7 is captured by the camera 201, the attribute recognition unit 212 outputs, as image attribute information, an object recognition result constituted by an available-for-evacuation region constituted by the region Z12 and the regions Z11 excluding the region Z3, and the dangerous region (unavailable-for-evacuation region) Z3 for the region Z2 as a travelable region as illustrated in the right part of FIG. 7.

<Method of Generating Evacuation Space Map>

Next, a specific method of generating an evacuation space map will be described.

Figure 8:
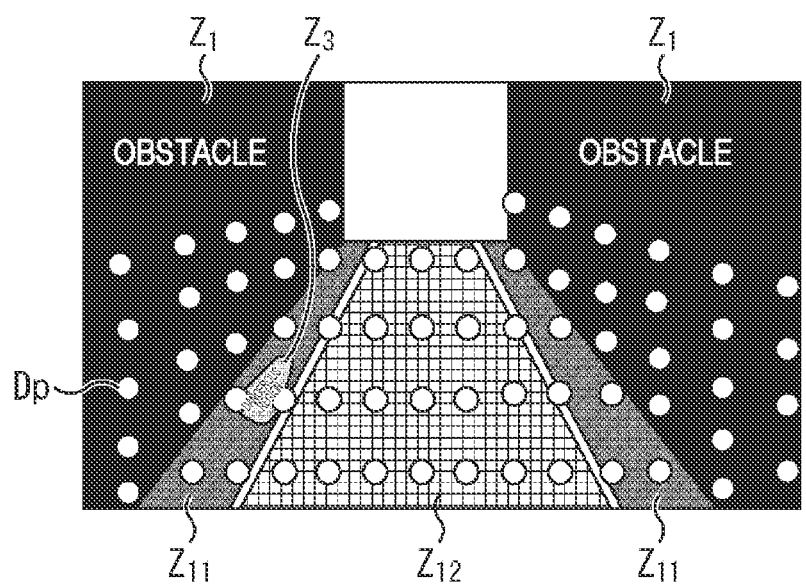
FIG. 8 is a diagram illustrating a method of generating an evacuation space map.

The polar coordinate grid processing unit 233 generates an image as illustrated in FIG. 8, for example, by synthesis from image attribute information supplied from the attribute recognition unit 212 and distance information supplied from the depth sensing unit 213.

FIG. 8 illustrates a state where an image, which is the image attribute information supplied from the attribute recognition unit 212 illustrated in the right part of FIG. 7, is combined with, for example, a distance measurement result Dp in a case where the depth sensor 202 is constituted by a LiDAR, as corresponding distance information in the image.

Note that, for example, the distance measurement result Dp from the depth sensor 202 constituted by a LiDAR is information having a resolution lower than the resolution of an image captured by the camera 201, and thus, in FIG. 8, the distance measurement result Dp is shown in the shape of spots on the image.

Figure 9:
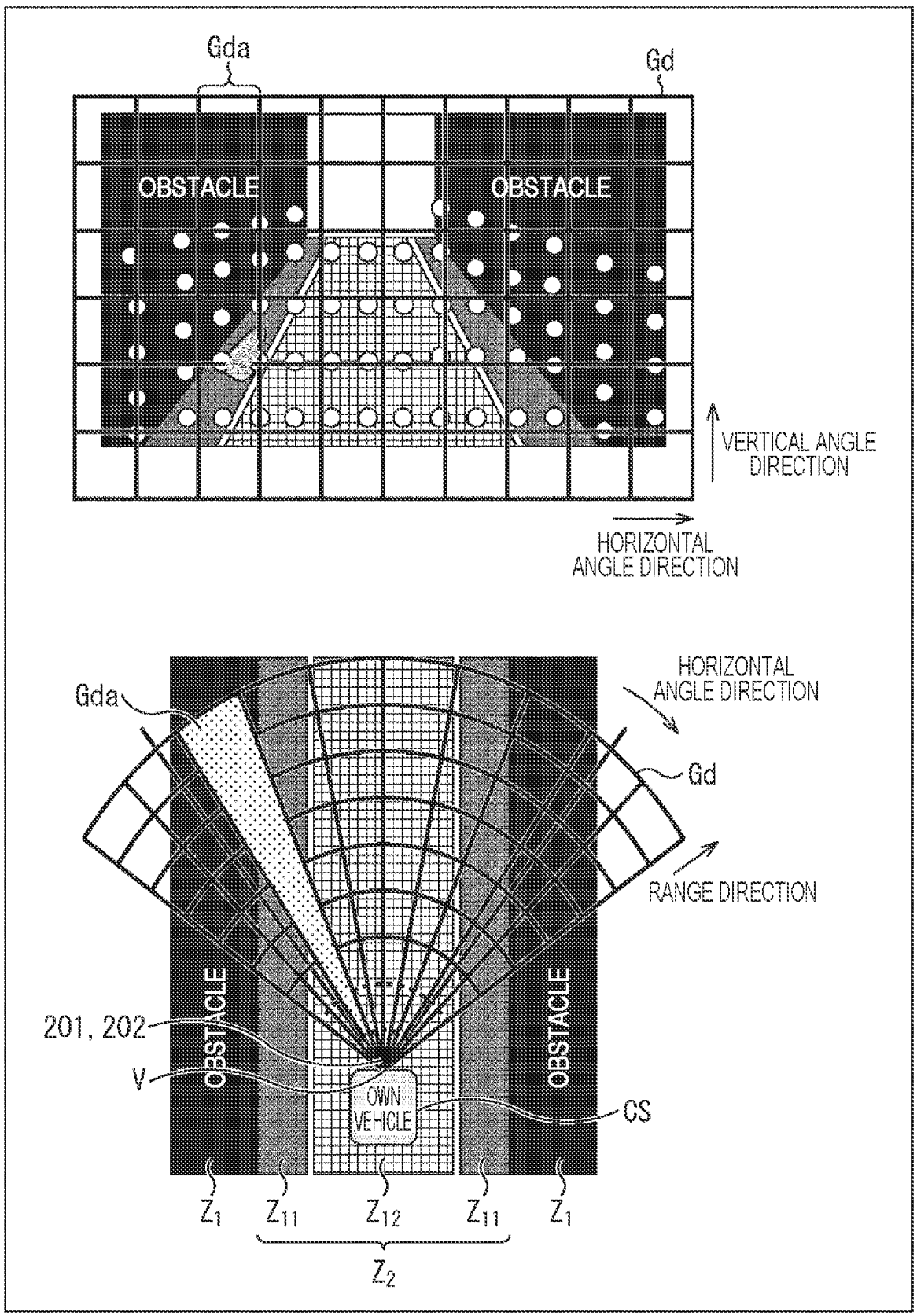
FIG. 9 is a diagram illustrating a polar coordinate grid used for generating an evacuation space map.

The polar coordinate grid processing unit 233 sets a grid-like polar coordinate grid Gd as illustrated in an upper part of FIG. 9 in an image as illustrated in FIG. 8.

In the upper part of FIG. 9, the polar coordinate grid Gd is set as cells constituted by 10 columns in a horizontal direction and 6 rows in a vertical direction, but the numbers of columns and rows are not limited thereto.

Incidentally, horizontal positions of the cells in the polar coordinate grid Gd in the upper part of FIG. 9 correspond to a horizontal angle direction of the polar coordinate grid Gd when viewed from the own vehicle SC illustrated in a lower part of FIG. 9, and vertical positions of the cells in the polar coordinate grid Gd in the upper part of FIG. 9 correspond to a range direction of the polar coordinate grid Gd from the own vehicle SC in the lower part of FIG. 9.

Thus, an image of a cell that is lower in the polar coordinate grid Gd in the upper part of FIG. 9 corresponds to an image of a cell in a region in the polar coordinate grid Gd at a distance closer to the own vehicle SC in the lower part of FIG. 9.

That is, the polar coordinate grid Gd is a grid indicated by a fan-shaped coordinate system when expressed in a top view when viewed from above the own vehicle SC as illustrated in the lower part of FIG. 9. Note that a region closer to the own vehicle SC than a dotted line in a grid Gd in the lower part of FIG. 9 is not included in an angle of view, and is therefore not reflected in a grid Gd in the upper part of FIG. 9.

More specifically, cells of six rows in a range Gda expressed by cells in a third column from the left in the upper part of FIG. 9 correspond to a range Gda of six cells in the radial polar coordinate grid Gd in the lower part of FIG. 9.

That is, information of images of the six cells from the top in the column in the range Gda in the upper part of FIG. 9 corresponds to information of the distance of a colored range of six cells from the outer peripheral portion of the range Gda in the lower part of FIG. 9. Note that, although the description is omitted, cells of other columns correspond to each other in a similar manner.

In the polar coordinate grid Gd in FIG. 9, also in units of columns indicated by other cells, the cells in the upper part and lower part of FIG. 9 correspond to each other.

The polar coordinate grid processing unit 233 generates an evacuation space map for each column as indicated by the range Gda in the grid Gd in the upper part of FIG. 9, that is, in units of horizontal angle regions, each unit having a predetermined range in the horizontal angle direction as indicated by the range Gda in the grid Gd in the lower part of FIG. 9.

Figure 10:
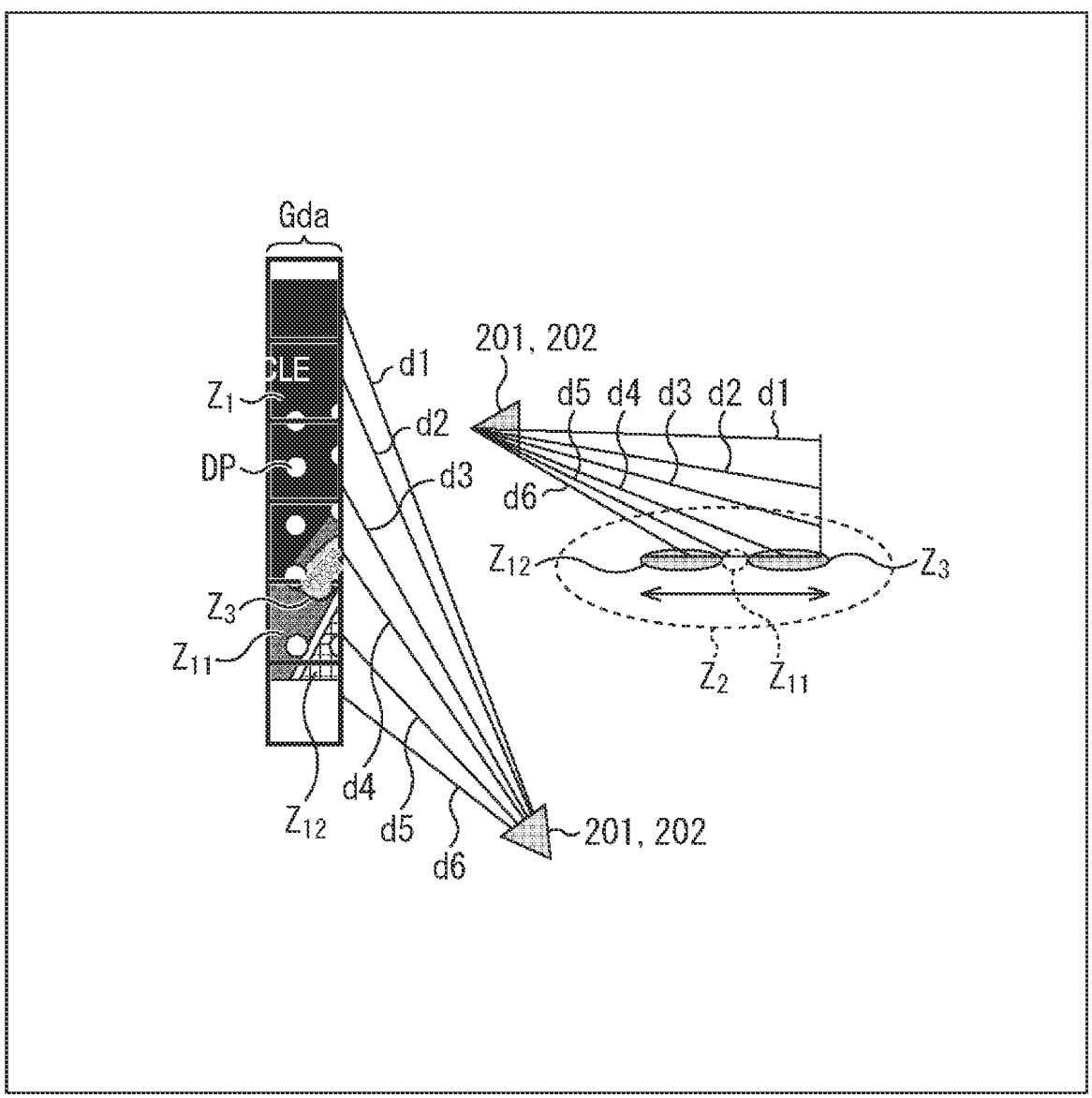
FIG. 10 is a diagram illustrating a method of generating an evacuation space map using a polar coordinate grid.

Here, in the case of the range Gda in the upper part of FIG. 9, as illustrated in a left part of FIG. 10, the polar coordinate grid processing unit 233 generates an evacuation space map by associating prior map information, image attribute information, and distance information with each other for each cell.

For example, in a case of a range Gda in the left part of FIG. 10, three cells from the top are a region Z1 recognized as an obstacle. As illustrated in a right part of FIG. 10, distances from the camera 201 or the depth sensor 202 of the own vehicle SC to the three cells from the top are distances d1 to d3 to the obstacle, respectively, from the top.

Furthermore, a dangerous region Z3 is included in a fourth cell from the top in the range Gda in the left part of FIG. 10. As illustrated in the right part of FIG. 10, the distance from the camera 201 or the depth sensor 202 of the own vehicle SC to the fourth cell from the top is a distance d4.

Moreover, a fifth cell from the top in the range Gda in the left part of FIG. 10 includes a region Z11 constituted by a road shoulder. As illustrated in the right part of FIG. 10, the distance from the camera 201 or the depth sensor 202 of the own vehicle SC to the fifth cell from the top is a distance d5.

Furthermore, a sixth cell from the top in the range Gda in the left part of FIG. 10 includes a region Z12 constituted by a traveling lane. As illustrated in the right part of FIG. 10, the distance from the camera 201 or the depth sensor 202 of the own vehicle SC to the sixth cell from the top is a distance d6. The region Z12 constituted by a traveling lane can also be recognized with the use of prior map information and the self-position of the own vehicle.

Thus, first, the polar coordinate grid processing unit 233 sets an untravelable region and a travelable region on the basis of distance information, prior map information, and image attribute information. That is, when information of each cell in the range Gda in FIG. 10 is associated with an occupancy map, as illustrated in a left part of FIG. 11, three cells from the top are expressed as the region Z1 constituted by an untravelable region, and three cells from the bottom are expressed as a region Z2 constituted by a travelable region. The polar coordinate grid processing unit 233 sets, as the travelable region Z2, a region located on a three-dimensional plane on which an own vehicle traveling lane region Z12 obtained from the prior map information, the image attribute information, or the like is placed and at a distance short of a point where the distance information is not placed on the three-dimensional plane from the sensor position, further sets, as the untravelable region Z1, a region that is recognized as an obstacle in the image attribute information or corresponds to a point where the distance information is not placed on the three-dimensional plane including the own vehicle traveling lane region, and sets the region Z1 constituted by the untravelable region and the region Z2 constituted by the travelable region, as in the occupancy map illustrated in the left part of FIG. 11.

Next, the polar coordinate grid processing unit 233 sets an available-for-evacuation region and an unavailable-for-evacuation region in the region Z2 constituted by the travelable region on the basis of the image attribute information. That is, the image attribute information is applied to the travelable region Z2 in the left part of FIG. 11, so that an evacuation space map for one column is generated, in which a range of a third cell from the bottom is set as an unavailable-for-evacuation region (dangerous region Z3), and a region Z11 constituted by a road shoulder and a region Z12 constituted by a traveling lane in two cells from the bottom are set as a region Z21 constituted by an available-for-evacuation region as illustrated in a right part of FIG. 11.

Figure 11:
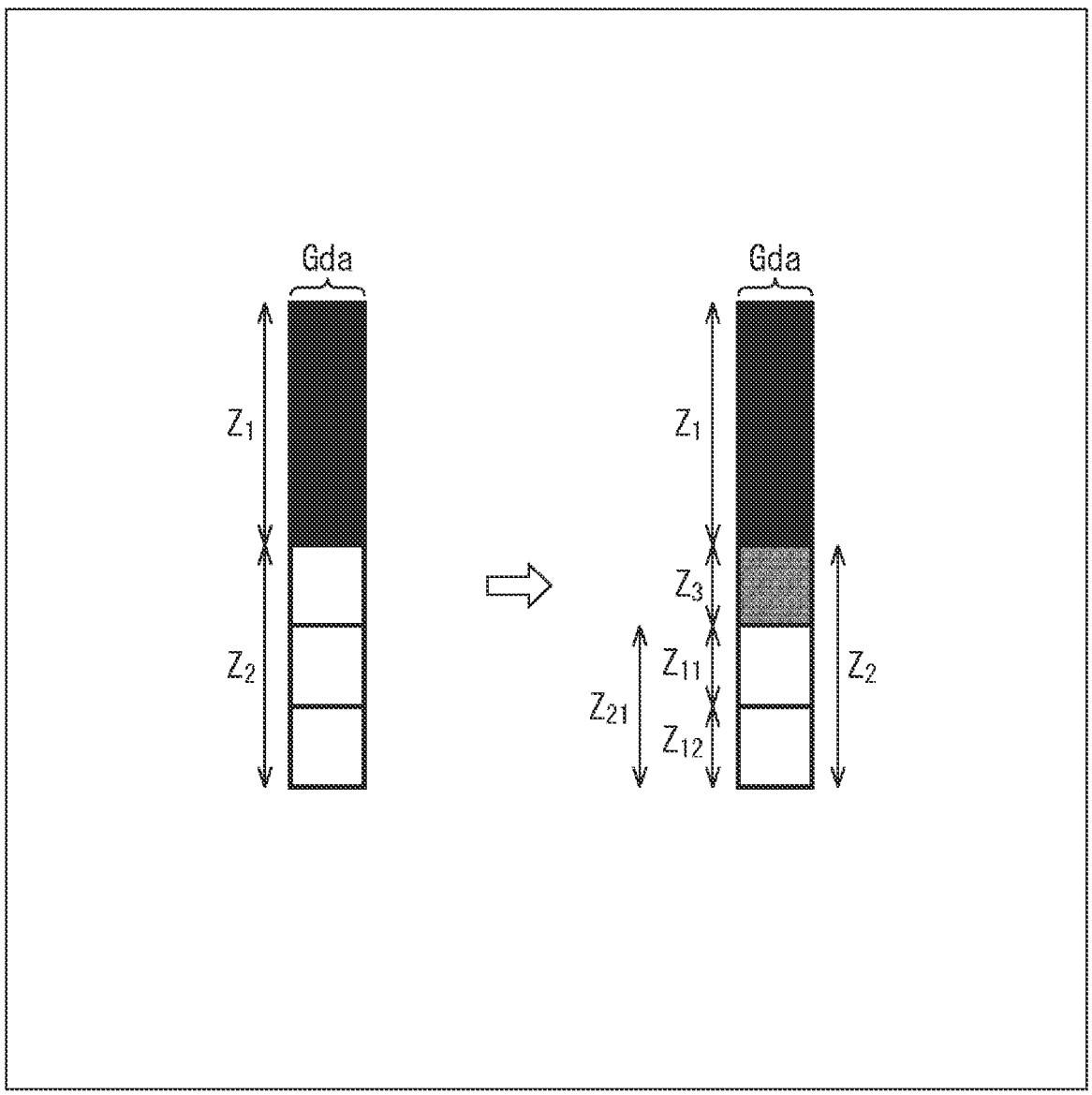
FIG. 11 is a diagram illustrating the method of generating the evacuation space map using the polar coordinate grid.

Note that the available-for-evacuation region described with reference to FIGS. 9 to 11 is a range of a traveling lane and road shoulders, and a dangerous region is not included in that range.

That is, first, as first-stage processing, an untravelable region and a travelable region are set on the basis of distance information, and an occupancy map is substantially set.

Then, next, as second-stage processing, after the occupancy map has been set, image attribute information is applied to the inside of the travelable region in the occupancy map so that an available-for-evacuation region and an unavailable-for-evacuation region are set, and thus an evacuation space map is generated.

Figure 12:
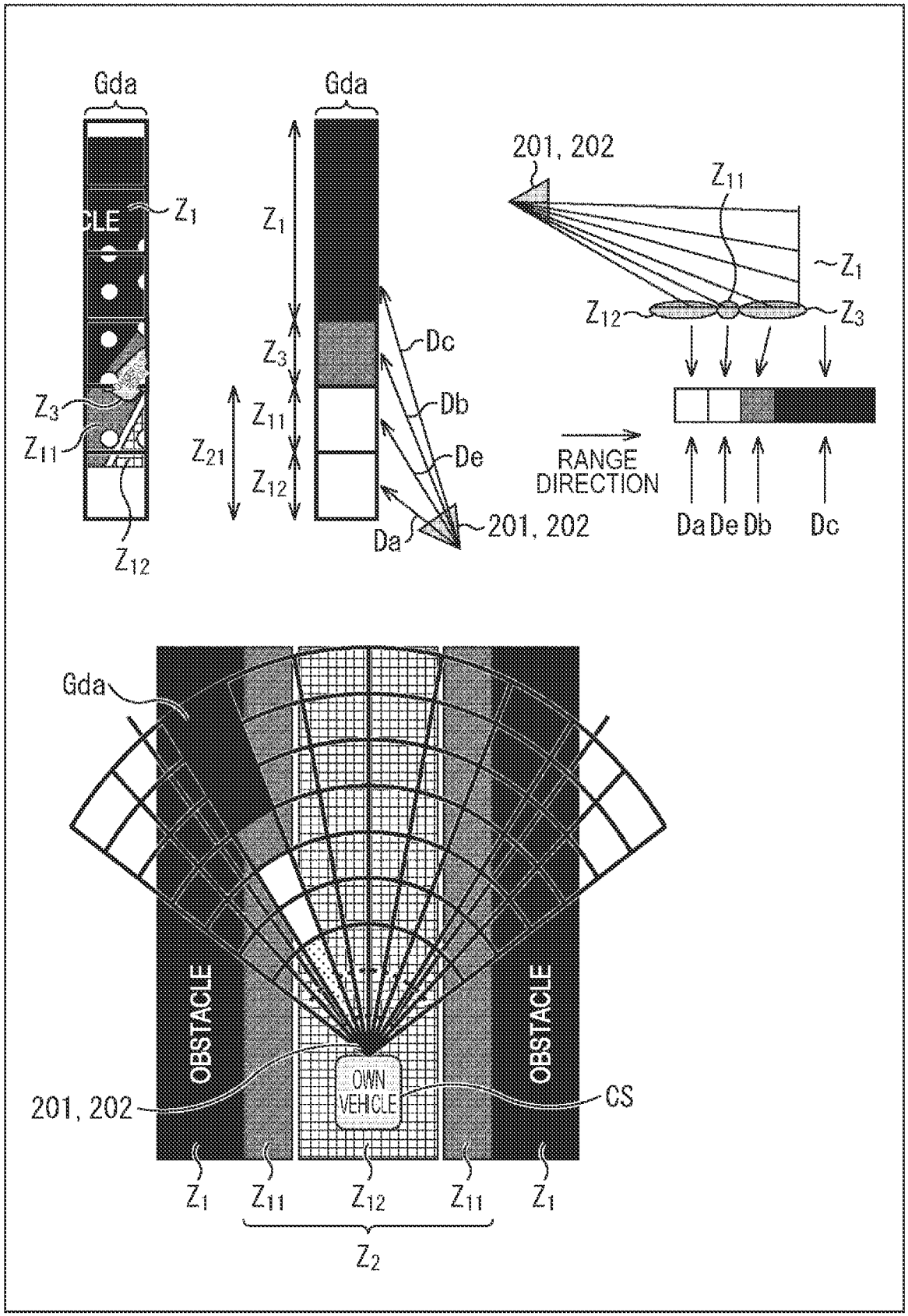
FIG. 12 is a diagram illustrating the method of generating the evacuation space map using the polar coordinate grid.

By the two-stage processing described above, the evacuation space map, which corresponds to a synthetic image from the image attribute information and the distance information indicated by a range Gda in an upper left part of FIG. 12, is as illustrated in an upper center part of FIG. 12.

Here, in the evacuation space map of the range Gda illustrated in the upper center part of FIG. 12, as illustrated in an upper right part of FIG. 12, the distance from a viewpoint position of the field of view V of the camera 201 and the depth sensor 202 to a region Z1 constituted by an obstacle is defined as a distance Dc, the distance to a dangerous region Z3 is defined as a distance Db, the distance to a lane region Z12, which is a traveling lane, is defined as a distance Da, and the distance to a region Z11 constituted by a road shoulder or the like is defined as a distance De.

Thus, the polar coordinate grid processing unit 233 sets the evacuation space map of the range Gda illustrated in the upper right part of FIG. 12 as an evacuation space map of a range Gda illustrated in a lower part of FIG. 12.

The polar coordinate grid processing unit 233 generates evacuation space maps for the entire range of the polar coordinate grid Gd, outputs the evacuation space maps to the evacuation space mapping unit 234, and causes the evacuation space maps to be stored and accumulated over time.

The evacuation space mapping unit 234 stores evacuation space maps in chronological order and accumulates the evacuation space maps over time, thereby expanding the evacuation space map in chronological order.

Figure 13:
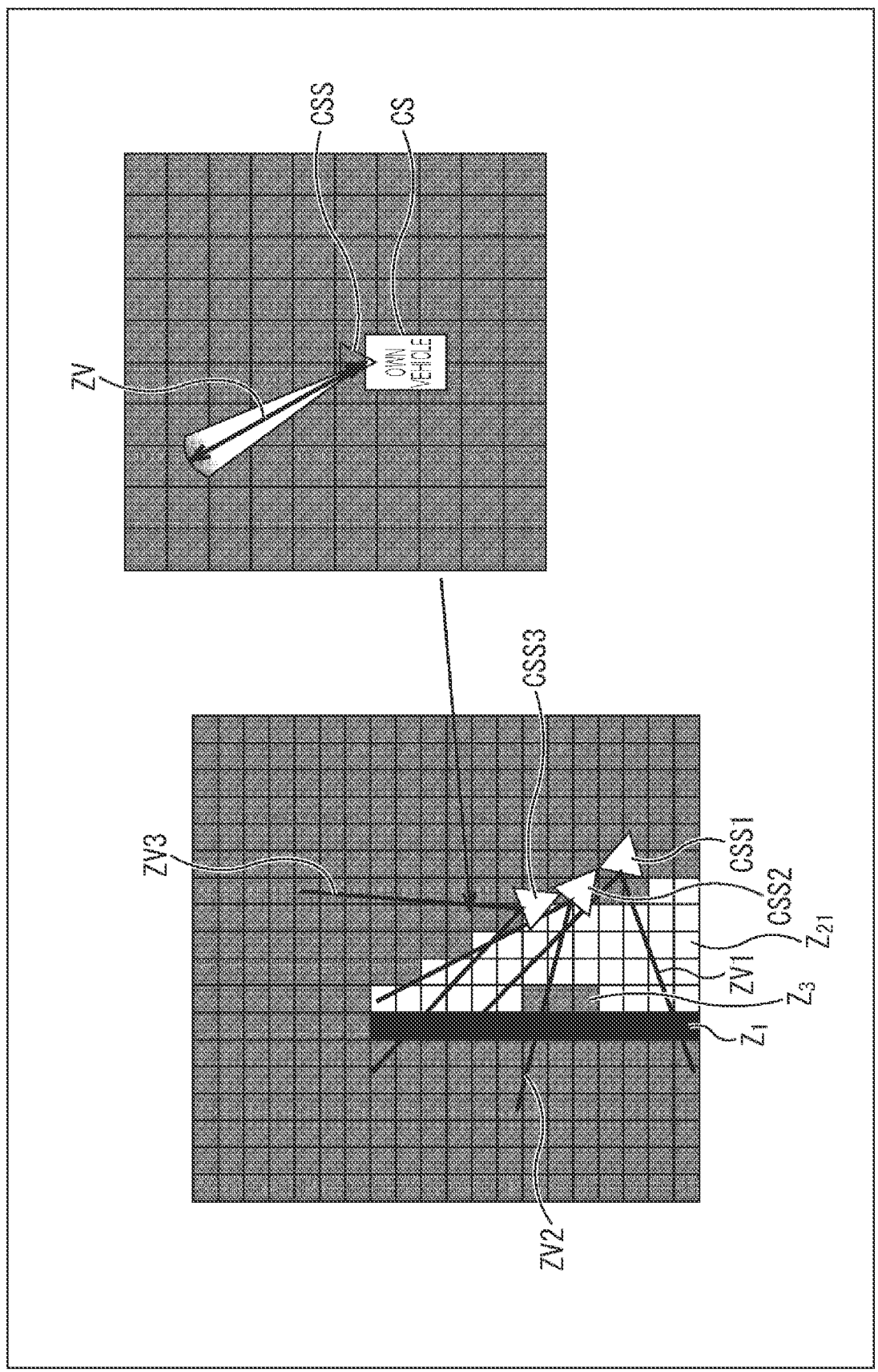
FIG. 13 is a diagram illustrating accumulation over time of the evacuation space map.

More specifically, as illustrated in a right part of FIG. 13, the evacuation space mapping unit 234 stores an evacuation space map ZV of the field of view V from a viewpoint position CSS of the camera 201 and the depth sensor 202 at a predetermined timing, and sequentially repeats this processing for accumulation over time.

That is, as illustrated in a left part of FIG. 13, the evacuation space mapping unit 234 stores an evacuation space map ZV1 of a field of view V1 from a viewpoint position CSS1 of the camera 201 and the depth sensor 202 at a time T1, and then an evacuation space map ZV2 of a field of view V2 from a viewpoint position CSS2 at a time T2 is superimposed on the evacuation space map ZV1 for accumulation over time.

In a similar manner, the evacuation space mapping unit 234 stores an evacuation space map ZV3 of a field of view V3 from a viewpoint position CSS3 at a time T3, and then the evacuation space map ZV3 is superimposed on the evacuation space maps ZV1 and ZV2 of the fields of view V1 and V2 at the times T1 and T2 for accumulation over time.

Then, by repeating similar processing, the evacuation space mapping unit 234 repeats accumulation over time of evacuation space maps in association with the self-position, thereby continuously expanding the evacuation space map sequentially in a spatial direction in chronological order.

Note that this time accumulation method is similar to a general time accumulation method for occupancy maps. For example, Binary Bayes Filter or the like can be used.

<Evacuation Space Map Generation Processing>

Figure 14:
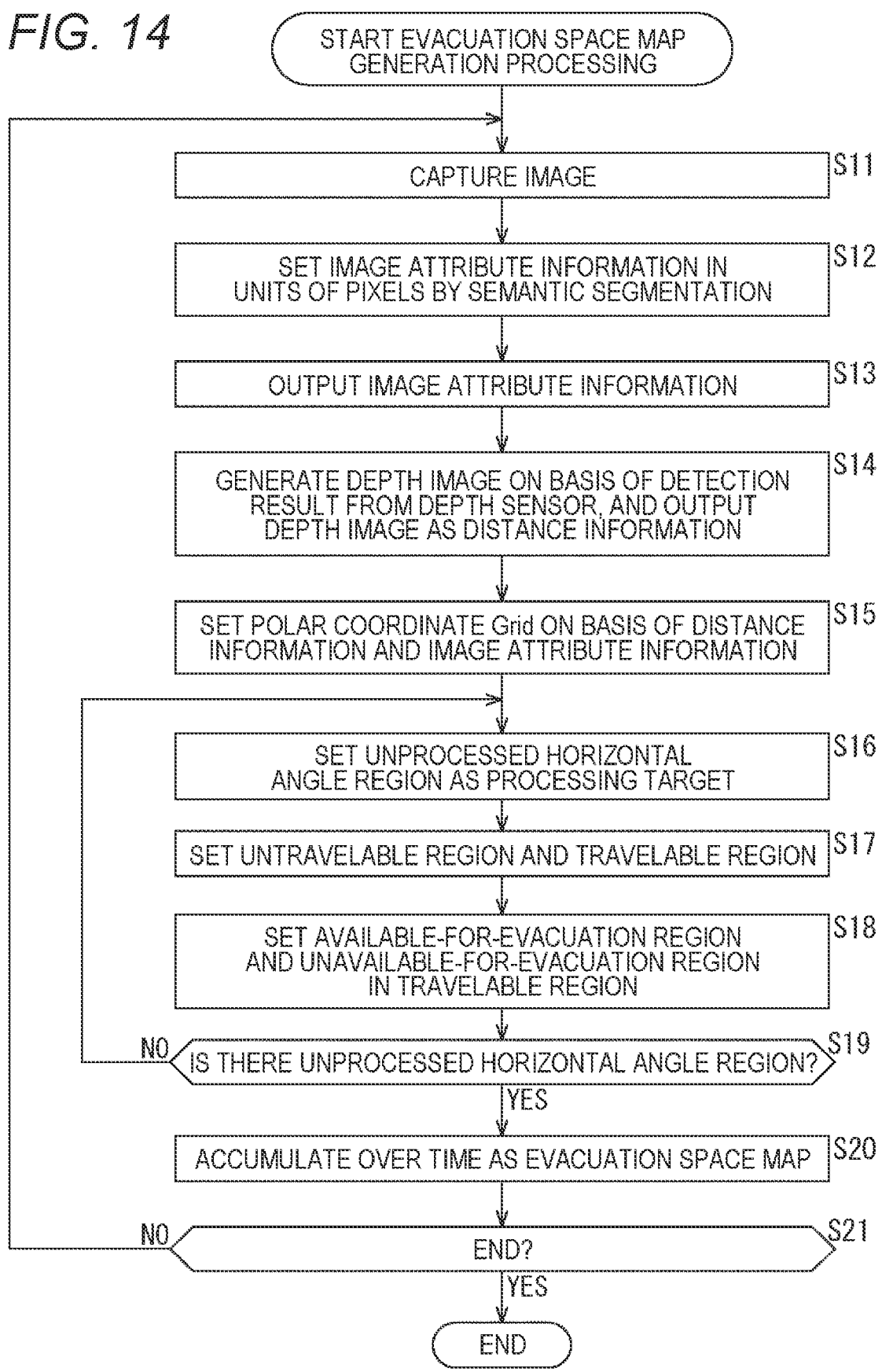
FIG. 14 is a flowchart illustrating evacuation space map generation processing.

Next, evacuation space map generation processing will be described with reference to a flowchart in FIG. 14.

In step S11, the camera 201 captures an image in a forward direction in which the own vehicle SC is traveling, and outputs the image to the outside-vehicle information detection unit 141.

In step S12, the attribute recognition unit 212 performs attribute determination in units of pixels on the image captured by the camera 201 by object recognition processing such as semantic segmentation, and generates image attribute information, which is a determination result.

In step S13, the attribute recognition unit 212 outputs the generated image attribute information to the polar coordinate grid processing unit 233 of the situation recognition unit 153.

In step S14, the depth sensor 202 captures a range image by using a LiDAR or the like, and outputs the range image to the depth sensing unit 213. The depth sensing unit 213 generates distance information in units of pixels on the basis of the range image, and outputs the distance information to the polar coordinate grid processing unit 233 of the situation recognition unit 153.

In step S15, the polar coordinate grid processing unit 233 generates a synthetic image by synthesis from the image attribute information and the distance information, and sets a polar coordinate grid Gd for the synthetic image by the method described with reference to FIG. 9.

In step S16, the polar coordinate grid processing unit 233 sets an unprocessed horizontal angle region in the polar coordinate grid Gd in FIG. 9 as a processing target. The horizontal angle region here is, for example, the range Gda in FIG. 9, and the unprocessed range Gda in the polar coordinate grid Gd is set as a horizontal angle region to be processed.

In step S17, on the basis of the distance information in the cells in the column set as the horizontal angle region to be processed in the polar coordinate grid Gd, the polar coordinate grid processing unit 233 sets an untravelable region and a travelable region in the horizontal angle region to be processed.

That is, by the processing in step S17, as described with reference to the left part of FIG. 11, the untravelable region and the travelable region are set, and thus a map corresponding to an occupancy map is generated.

In step S18, on the basis of the image attribute information in the travelable region in the horizontal angle region to be processed in the polar coordinate grid Gd, the polar coordinate grid processing unit 233 sets an available-for-evacuation region and an unavailable-for-evacuation region.

Then, the polar coordinate grid processing unit 233 generates an evacuation space map constituted by an available-for-evacuation region set in the travelable region and an unavailable-for-evacuation region, and stores the evacuation space map in the evacuation space mapping unit 234.

That is, as described with reference to the right part of FIG. 11, by the processing in step S18, the available-for-evacuation region and the unavailable-for-evacuation region are set in the travelable region in the map corresponding to the occupancy map, and thus the evacuation space map is generated.

In step S19, the polar coordinate grid processing unit 233 determines whether or not there is an unprocessed horizontal angle region. In a case where there is an unprocessed horizontal angle region, the processing returns to step S16.

That is, in step S16, the processing in steps S16 to S19 is repeated until evacuation space maps are generated for all horizontal angle regions.

Then, when the evacuation space maps of all the horizontal angle regions have been generated in step S19, the processing proceeds to step S20.

In step S20, the evacuation space mapping unit 234 accumulates over time evacuation space maps of all the horizontal angle regions in association with the self-position, and expands the evacuation space map in chronological order.

In step S21, the polar coordinate grid processing unit 233 determines whether or not an instruction to end the processing has been given. If an instruction to end the setting has not been given, the processing returns to step S11, and the subsequent processing is repeated.

Then, in step S21, if an instruction to end the setting has been given, the processing ends.

By the above processing, after an untravelable region and a travelable region have been set on the basis of image attribute information and distance information, an available-for-evacuation region and a not-available-for-evacuation region are further set in the travelable region, and thus an evacuation space map constituted by the available-for-evacuation region can be generated.

Note that, although the own vehicle SC itself generates an evacuation space map in the processing described above, an evacuation space map generated by another vehicle may be acquired.

Furthermore, evacuation space maps generated by a plurality of vehicles may be aggregated in a cloud server or the like, and may be downloaded and used by a variety of vehicles.

From such a standpoint, evacuation space maps may be generated by the vehicle itself during traveling, or may be acquired in advance from other vehicles, a cloud server, or the like.

However, since information of the evacuation space maps is generated on the basis of various types of information regarding a road, weather, and the like that change from moment to moment, in a case where the information is not generated by the vehicle itself, a situation is desirable in which the information is updated at a predetermined time interval so that information that is new to some extent is acquired.

<Example of Emergency Evacuation>
(No. 1)

Next, an example of emergency evacuation to an evacuation space in response to an approaching emergency vehicle by using the evacuation space map generated by the above-described processing will be described.

Figure 15:
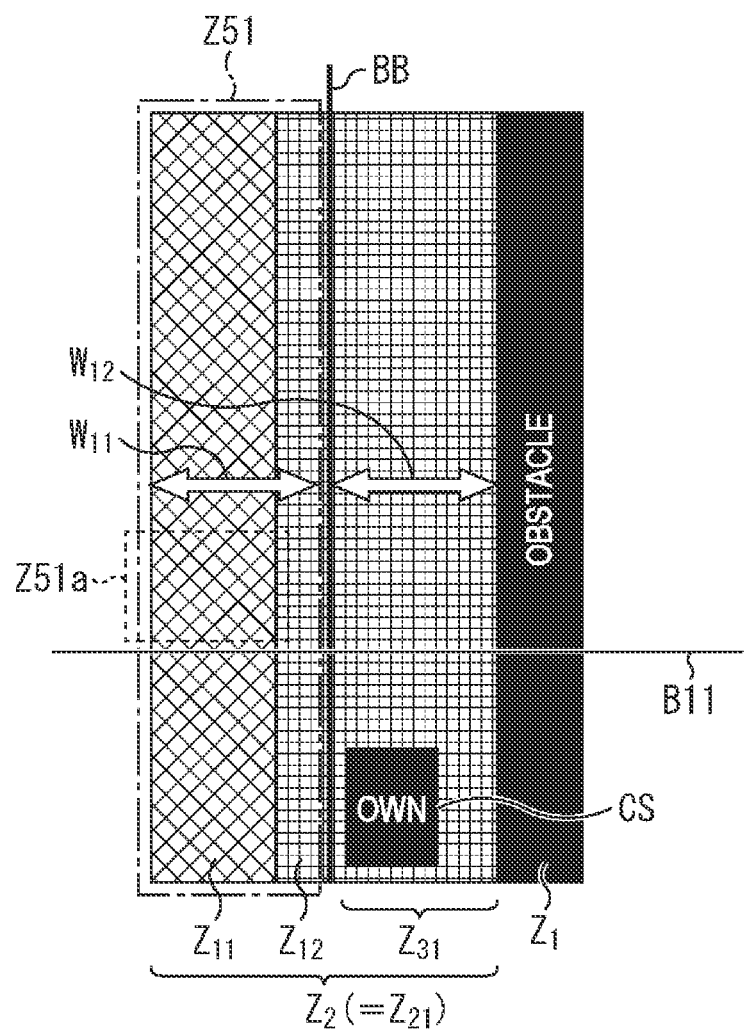
FIG. 15 is a diagram illustrating an example of a first evacuation method using an evacuation space map.

Consideration will be given to a case of an evacuation space map in which, as illustrated in FIG. 15, all three types of regions, that is, an obstacle region Z1, a traveling lane region Z12, and a region Z11 constituted by a road shoulder or the like that is available for evacuation, are set on the right side with respect to the forward direction of the own vehicle CS, for example.

Here, it is assumed that a width in the horizontal direction of the regions Z11 and Z12 in FIG. 15 is equal to or larger than a width obtained by adding a width W11 for the own vehicle CS to evacuate and a width W12 necessary for an emergency vehicle to pass.

That is, in FIG. 15, the entire area of a region Z2 constituted by the regions Z11 and Z12 excluding the obstacle region Z1 is registered as an available-for-evacuation region (Z21) in the evacuation space map.

In the case of FIG. 15, the planning unit 134 searches for evacuation space candidates for the own vehicle CS in the available-for-evacuation region, which is the entire area of the region Z2, on the basis of the evacuation space map, and specifies, as an evacuation space, a region most suitable for evacuation among the evacuation space candidates found in the search.

More specifically, in a case where an emergency vehicle EC is approaching from behind, the evacuation space is a space where the own vehicle SC is evacuated and pulled over for the purpose of clearing the traveling lane for the emergency vehicle EC.

Thus, in the case of FIG. 15, the planning unit 134 sets, as a cleared region Z31, a region including a region having the width W12 on the traveling lane side for allowing the emergency vehicle EC to pass, in the available-for-evacuation region in the evacuation space map.

Here, when setting the cleared region Z31, the planning unit 134 sets the cleared region Z31 constituted by the region having the width W12 for the emergency vehicle EC such that a region recognized as the region Z12 constituted by a traveling lane is included, for example, on the basis of the image attribute information.

Furthermore, the planning unit 134 searches, as an evacuation space candidate region, a region excluding the cleared region Z31 in the available-for-evacuation region, that is, a region Z51 that is on the road shoulder side of a boundary BB of the cleared region Z31, has the width W11 necessary for the own vehicle CS to evacuate, and is surrounded by a long dashed short dashed line in the drawing.

Moreover, the planning unit 134 specifies, as an evacuation space, a region Z51a surrounded by a dotted line in the drawing, which is the nearest region ahead of a braking distance B11 of the own vehicle CS in the region Z51 as an evacuation space candidate region that has been searched, and has the width W11 for the own vehicle CS to evacuate to the road shoulder side of the traveling lane.

Then, the planning unit 134 plans a route for evacuating the own vehicle CS in the region Z51a constituted by the specified evacuation space, and outputs, to the operation control unit 135, operation control information for moving and pulling over following the planned route.

On the basis of the operation control information from the planning unit 134, the operation control unit 135 operates the accelerator, the brake, and the steering to move and pull over the own vehicle CS to the evacuation space in order to implement a behavior for pulling over to the region Z51a constituted by the specified evacuation space.

With such a series of operations, in a case where an emergency vehicle is approaching, the own vehicle CS can safely pull over and evacuate while clearing the traveling lane for the emergency vehicle.

Note that, in the case of FIG. 15, an example has been described in which the obstacle region Z1 is set on the right side of the region Z12 constituted by a traveling lane, and the region Z11 constituted by a road shoulder exists on the left side of the traveling lane region Z12, so that the region Z51 as the evacuation space is set on the left side of the region Z12 constituted by a traveling lane.

However, since it is only required to clear the region Z12 constituted by a traveling lane for the emergency vehicle, in a case where the region Z11 constituted by a road shoulder is provided only on the right side of the region Z12, the cleared region Z31 is set on the left side of the traveling lane region Z12, and the region Z51a as the evacuation space is set on the right side of the region Z12 constituted by a traveling lane.

That is, in processing of evacuation in response to an approaching emergency vehicle, an evacuation space candidate region Z51 that allows the own vehicle SC to evacuate so that the cleared region Z31 can be set is searched, and in the searched evacuation space candidate region Z51, a region that is ahead of the braking distance of the own vehicle SC and is the nearest region is specified as the region Z51a constituted by an evacuation space.

Note that, as the traveling lane region Z12 for an emergency vehicle to travel included in the cleared region Z31 is wider, it is possible to secure quicker and safer movement of the emergency vehicle. Thus, it is desirable that the evacuation space candidate region Z51 and the region Z51a constituted by an evacuation space are set such that the traveling lane region Z12 included in the cleared region Z31 becomes wider as much as possible. For example, when the cleared region Z31 is set, a width wider than the width W12 for the emergency vehicle by a predetermined ratio may be set.

(No. 2)

Figure 16:
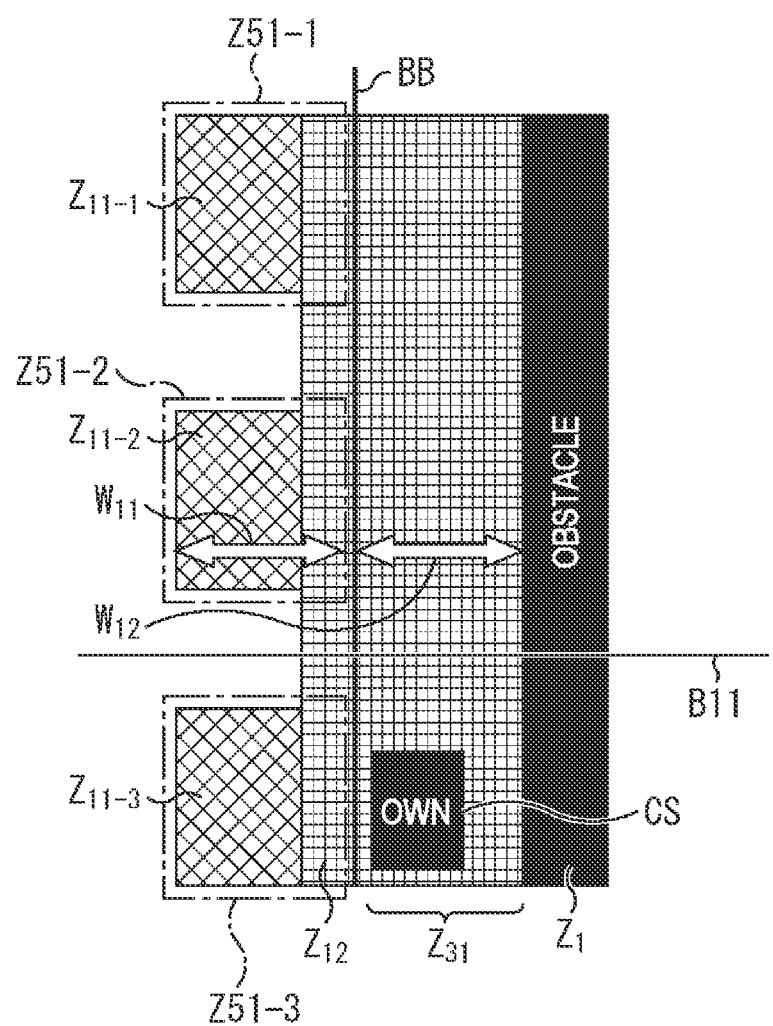
FIG. 16 is a diagram illustrating an example of a second evacuation method using an evacuation space map.

Furthermore, consideration will be given to a case of an evacuation space map in which, as illustrated in FIG. 16, three types of regions, that is, an obstacle region Z1, a traveling lane region Z12, and regions Z11-1 to Z11-3 constituted by road shoulders or the like that are available for evacuation, are set on the right side with respect to the forward direction of the own vehicle CS, for example.

Here, it is assumed that each width in the horizontal direction of the regions Z11-1 to Z11-3 and Z12 is equal to or larger than a width obtained by adding a width W11 for the own vehicle CS to evacuate and a width W12 necessary for an emergency vehicle to pass.

That is, in the case illustrated in FIG. 16, the regions Z11-1 to Z11-3 and Z12 are registered as available-for-evacuation regions in the evacuation space map.

Therefore, in the case of FIG. 16, the planning unit 134 searches, as evacuation space candidate regions, regions Z51-1 to Z51-3 surrounded by long dashed short dashed lines in the drawing, which are on the road shoulder side of a boundary BB of a cleared region Z31 constituted by a region having the width W12 on the traveling lane side for allowing the emergency vehicle EC to pass and have the width W11 necessary for the own vehicle CS to evacuate, in the available-for-evacuation regions in the evacuation space map.

Moreover, the planning unit 134 specifies, as an evacuation space, the region Z51-2 surrounded by a dotted line in the drawing, which is the nearest ahead of the braking distance B11 of the own vehicle CS among the regions Z51-1 to Z51-3 as the evacuation space candidate regions that have been searched, and has the width W11 for the own vehicle CS to evacuate to the road shoulder side of the traveling lane.

That is, in the case of FIG. 16, the planning unit 134 plans a route for evacuating the own vehicle CS to the region Z51-2.

The subsequent operation is similar to that in the case of FIG. 15.

With such an operation, even in a case where a region serving as an evacuation space is limited to a part of the road shoulder, the own vehicle CS can safely pull over and evacuate while clearing the traveling lane for an emergency vehicle in a case where the emergency vehicle is approaching.

(No. 3)

Figure 17:
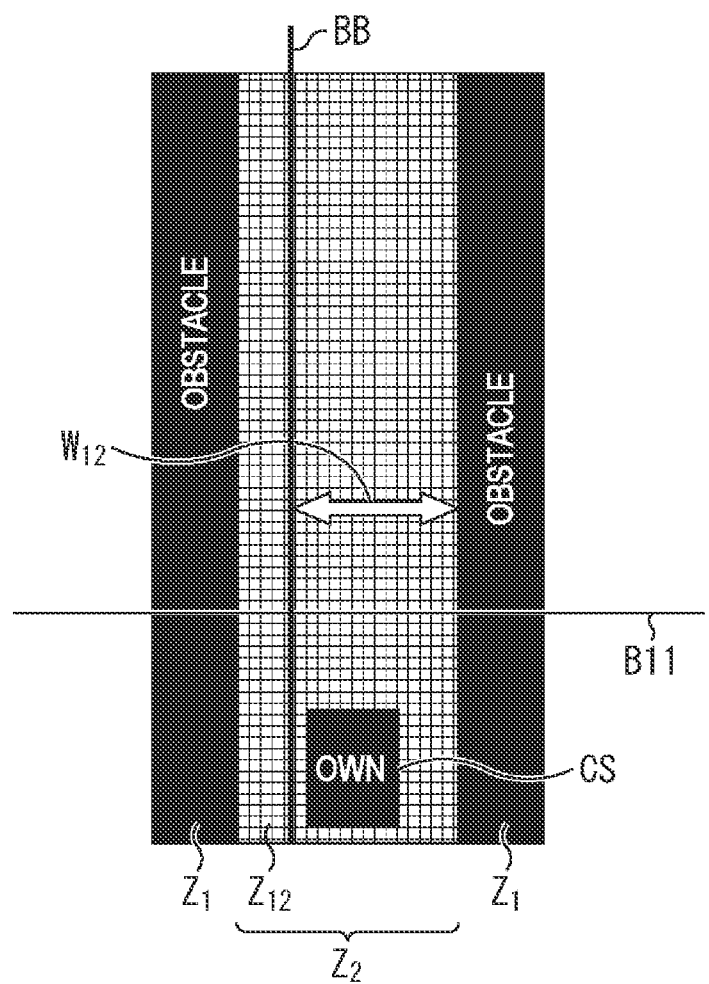
FIG. 17 is a diagram illustrating an example of a third evacuation method using an evacuation space map.

Moreover, consideration will be given to a case of an evacuation space map in which, as illustrated in FIG. 17, only two types of regions, that is, an obstacle region Z1 and a traveling lane region Z12, are set on the right side with respect to the forward direction of the own vehicle CS, and each of the horizontal width of Z12 is less than a width obtained by adding a width W11 for the own vehicle CS to evacuate and a width W12 necessary for an emergency vehicle to pass, for example.

In the case of FIG. 17, since an available-for-evacuation region in the evacuation space map is the entire area of the traveling lane region Z12, there is no region having the width W11 necessary for the own vehicle CS to evacuate on the road shoulder side of a boundary BB of a region having the width W12 on the traveling lane side for allowing the emergency vehicle EC to pass, and an evacuation space candidate region is not searched. Therefore, in the case of FIG. 17, an evacuation space is not specified.

That is, in FIG. 17, if the own vehicle CS pulls over so that an evacuation space is set on the left side of the region Z12 serving as a traveling lane, the own vehicle CS is blocking the traveling lane, so that the emergency vehicle EC approaching from behind cannot pass through the region Z12 constituted by a traveling lane.

Thus, in a case as illustrated in FIG. 17, since the own vehicle CS cannot specify an evacuation space, the own vehicle CS continues traveling to a position where an evacuation space can be specified.

With such processing, it is possible to prevent the own vehicle CS from obstructing passage of an emergency vehicle.

(No. 4)

Figure 18:
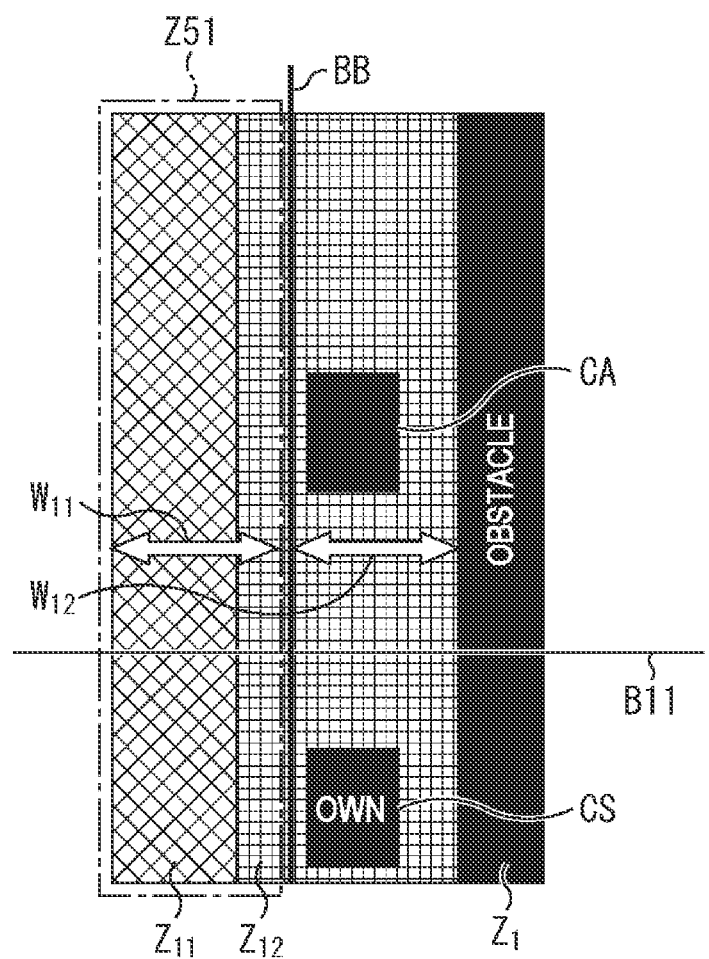
FIG. 18 is a diagram illustrating an example of the first evacuation method using an evacuation space map.

Furthermore, consideration will be given to a case in which, as illustrated in FIG. 18, the evacuation space map is similar to that in the case of FIG. 15 and further includes a preceding vehicle CA ahead of the own vehicle CS, for example.

In the case of FIG. 18, the own vehicle CS continues traveling following the preceding vehicle CA.

With such processing, it is possible to prevent the own vehicle CS from obstructing passage of an emergency vehicle.

Note that, in the case of FIG. 18, since it is possible to specify a region Z51a serving as an evacuation space as illustrated in FIG. 15, after traveling following the preceding vehicle CA for a predetermined time, the region Z51a constituted by an evacuation space may be specified at a position short of the preceding vehicle CA, and the own vehicle CS may be moved and pulled over to evacuate, for example.

<Emergency Evacuation Processing>

Figure 19:
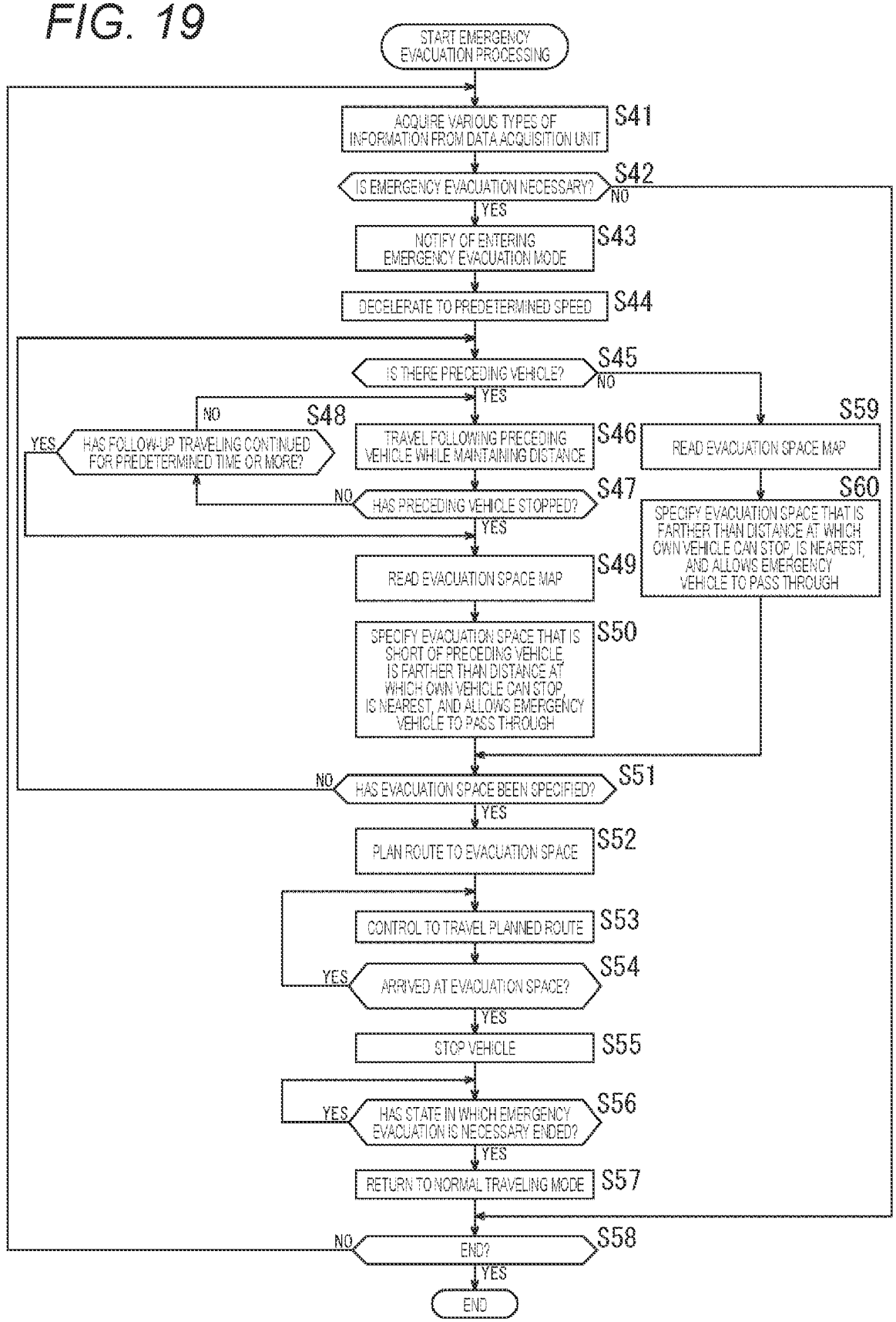
FIG. 19 is a flowchart illustrating emergency evacuation processing.

Next, emergency evacuation processing by the vehicle control system of the present disclosure will be described with reference to a flowchart in FIG. 19. Note that the emergency evacuation processing is based on the premise that an evacuation space map is generated by the evacuation space map generation processing described above performed as parallel processing or pre-processing.

In step S41, the outside-vehicle information detection unit 141 acquires an image captured by the camera 201, a depth image detected by the depth sensor 202, and information of a prior map stored in the storage unit 111, which are acquired by the data acquisition unit 102, to detect a vehicle, and also detects and outputs, to the situation recognition unit 153, image attribute information and distance information.

At this time, on the basis of position information supplied from the GPS 203, the image, the depth image, and the information of the prior map, the self-position estimation unit 132 outputs detailed position information and posture information of the own vehicle CS to the situation recognition unit 153.

More specifically, the vehicle detection unit 211 detects the vehicle by image recognition from the image, and outputs a result of the detection to the emergency vehicle identification unit 231 and the vehicle tracking unit 232 of the situation recognition unit 153.

Here, the vehicle tracking unit 232 stores and tracks information regarding the vehicle detected from the image in chronological order, and outputs, to the emergency vehicle identification unit 231, information for identifying whether the vehicle is a preceding vehicle traveling away from the own vehicle SC, an oncoming vehicle approaching the own vehicle SC from ahead, or a following car approaching the own vehicle SC from behind, and also outputs the information to the planning unit 134 via the situation prediction unit 154.

Furthermore, the attribute recognition unit 212 recognizes an attribute of an object in the image in units of pixels on the basis of the image, generates image attribute information, and outputs the image attribute information to the polar coordinate grid processing unit 233 of the situation recognition unit 153.

Moreover, the depth sensing unit 213 generates distance information in units of pixels on the basis of information of the depth image, and outputs the distance information to the polar coordinate grid processing unit 233.

At this time, the polar coordinate grid processing unit 233 acquires the information of the prior map stored in the storage unit 111, and the detailed self-position information and the posture information supplied by the self-position estimation unit 132.

In step S42, the emergency vehicle identification unit 231 determines whether or not an emergency vehicle is approaching and emergency evacuation is necessary.

More specifically, for the vehicle detected from the image, the emergency vehicle identification unit 231 determines whether an emergency vehicle is approaching on the basis of whether or not there is an emergency vehicle approaching the own vehicle SC on the basis of tracking information supplied from the vehicle tracking unit 232, for example.

Furthermore, the emergency vehicle identification unit 231 determines whether an emergency vehicle is approaching on the basis of whether there is a sound of a siren emitted from an emergency vehicle and whether there is an emergency vehicle in the image under the condition that the siren sound has been detected on the basis of a sound outside the vehicle collected by a microphone in the data acquisition unit 102, for example.

Moreover, the emergency vehicle identification unit 231 controls the communication unit 103 to determine whether an emergency vehicle is approaching on the basis of a variety of communication signals such as whether or not communication in a frequency band used by emergency vehicles can be intercepted, whether there is a signal notifying of an approaching emergency vehicle from a beacon provided on a road, and whether there is vehicle-to-vehicle communication notifying of an approaching emergency vehicle.

Furthermore, the emergency vehicle identification unit 231 determines whether an emergency vehicle is approaching by intervention of a user, who is the driver of the own vehicle SC, on the basis of whether an operation has been made on an operation device such as a touch panel, a button, a microphone, a switch, or a lever in the input unit 101.

The emergency vehicle identification unit 231 determines whether an emergency vehicle is approaching by at least one of these pieces of determination processing, and determines whether or not emergency evacuation is necessary.

If it is determined in step S42 that emergency evacuation is necessary, the processing proceeds to step S43.

In step S43, the emergency vehicle identification unit 231 outputs, to the output unit 106 and the planning unit 134 via the situation prediction unit 154, information indicating that an emergency vehicle is approaching and information indicating that the mode will be shifted into the evacuation mode in response to the approaching emergency vehicle.

At this time, the output unit 106 notifies the user, who is the driver, that an approaching emergency vehicle has been detected by an image or a sound using a display, a speaker, or the like, and notifies of a shift into the evacuation mode in response to the detection of the emergency vehicle.

In step S44, the planning unit 134 generates motion control information for decelerating the own vehicle SC to a predetermined speed, and outputs the operation control information to the operation control unit 135. By this processing, the operation control unit 135 controls the brake or the like to reduce the traveling speed of the own vehicle SC to a predetermined speed.

In step S45, the planning unit 134 determines whether or not there is a preceding vehicle on the basis of the tracking information supplied from the vehicle tracking unit 232 via the situation prediction unit 154.

In step S45, if the planning unit 134 determines that there is a preceding vehicle, the processing proceeds to step S46.

In step S46, the planning unit 134 generates operation control information so that the own vehicle SC travels following the preceding vehicle while maintaining a distance from the preceding vehicle at a predetermined distance that is sufficient for ensuring safety, and outputs the operation control information to the operation control unit 135.

The operation control unit 135 controls the accelerator, the brake, the steering, and the like of the own vehicle SC on the basis of the operation control information to cause the own vehicle SC to travel following the preceding vehicle while maintaining the distance from the preceding vehicle at the predetermined distance that is sufficient for ensuring safety.

Note that the processing in step S46 includes, in a case where the preceding vehicle has pulled over in a state where there is no evacuation space available for evacuation, processing of pulling over the vehicle even in a state where it is not possible to clear the traveling lane for the emergency vehicle while maintaining the predetermined distance from the preceding vehicle.

In step S47, the planning unit 134 determines whether or not the preceding vehicle has pulled over on the basis of the tracking information.

In step S47, in a case where the preceding vehicle does not pull over and continues traveling, the processing proceeds to step S48.

In step S48, the planning unit 134 determines whether or not the traveling following the preceding vehicle has continued for a predetermined time or more.

If it is determined in step S48 that the traveling following the preceding vehicle has not continued for the predetermined time, the processing returns to step S46.

That is, in a case where there is a preceding vehicle, as long as the preceding vehicle is traveling without pulling over, the own vehicle SC continues to travel following the preceding vehicle if the state of traveling following the preceding vehicle has not continued for the predetermined time.

Then, in step S48, if the state of traveling following the preceding vehicle has continued for the predetermined time or more, the processing proceeds to step S49.

Furthermore, in step S47, if the preceding vehicle has stopped traveling, the processing proceeds to step S49.

That is, in a case where there is a preceding vehicle, if follow-up traveling has continued for the predetermined time or more, or if the preceding vehicle has pulled over, the processing proceeds to step S49.

In step S49, the planning unit 134 reads the evacuation space map accumulated in the evacuation space mapping unit 234 via the situation prediction unit 154.

In step S50, the planning unit 134 specifies, on the basis of the evacuation space map, an evacuation space that is short of the preceding vehicle, is farther than a distance that allows for safe pulling over within the braking distance of the own vehicle, is the nearest, and allows for securing a width for the emergency vehicle.

More specifically, the planning unit 134 searches for evacuation space candidate regions on the basis of the evacuation space map, and specifies, from among the evacuation space candidate regions found in the search, an evacuation space that is short of the preceding vehicle, is farther than the distance that allows for safe pulling over within the braking distance of the own vehicle, is the nearest, and allows for securing a width for the emergency vehicle.

In step S51, the planning unit 134 determines whether or not an evacuation space exists and has been specified.

In step S51, if an evacuation space cannot be specified, the processing returns to step S45.

That is, in a case where there is no evacuation space, the processing in steps S45 to S51 is repeated.

That is, since the own vehicle SC cannot safely pull over and evacuate while clearing the traveling lane for the emergency vehicle approaching from behind, the own vehicle SC continues the follow-up traveling while maintaining the predetermined distance from the preceding vehicle, or pulls over while maintaining the predetermined distance.

Furthermore, if an evacuation space is specified in step S51, the processing proceeds to step S52.

In step S52, the planning unit 134 plans a route with the evacuation space as a destination, generates operation control information for implementing a planned operation, and outputs the operation control information to the operation control unit 135.

In step S53, the operation control unit 135 controls the accelerator, the brake, the steering, and the like of the own vehicle SC on the basis of the operation control information supplied from the planning unit 134, and causes the own vehicle SC to travel along the route with the evacuation space as the destination.

In step S54, the planning unit 134 determines whether or not the own vehicle SC has arrived at the evacuation space, which is the destination, on the basis of detailed position information and posture information of the own vehicle SC.

If the own vehicle SC has not arrived at the evacuation space in step S54, the processing in steps S53 and S54 is repeated, and the own vehicle SC continues traveling toward the evacuation space, which is the destination.

If it is determined in step S54 that the own vehicle SC has arrived at the evacuation space, which is the destination, the processing proceeds to step S55.

In step S55, the planning unit 134 generates operation control information for pulling over the own vehicle SC, and outputs the operation control information to the operation control unit 135. With this arrangement, the operation control unit 135 pulls over the own vehicle SC to the evacuation space on the basis of the operation control information.

In step S56, the emergency vehicle identification unit 231 determines whether or not the state where emergency evacuation is necessary has ended, and similar processing is repeated until it is determined that the state where emergency evacuation is necessary has ended.

Then, in step S56, for example, in a case where the emergency vehicle approaches from behind, and travels and passes through the traveling lane that has been cleared by the evacuation to the evacuation space and pulling over, and it is determined that the state where emergency evacuation is necessary has ended, the processing proceeds to step S57.

In step S57, the emergency vehicle identification unit 231 outputs information indicating that the travel mode is shifted from the evacuation mode to the normal mode, to the output unit 106 and the planning unit 134 via the situation prediction unit 154.

With this arrangement, the output unit 106 presents information indicating that the travel mode is shifted from the evacuation mode to the normal mode to a user, who is the driver, by sound or image.

Furthermore, the planning unit 134 re-plans a route to an original destination, generates operation control information for implementing a re-planned operation, and outputs the operation control information to the operation control unit 135.

The operation control unit 135 controls the accelerator, the brake, the steering, and the like on the basis of the operation control information for implementing the operation for traveling the re-planned route to the original destination, so that the own vehicle SC travels the route to the destination.

In step S58, the planning unit 134 determines whether or not an instruction to end the operation has been given. If an instruction to end the operation has not been given, the processing returns to step S41, and the subsequent processing is repeated.

Furthermore, in step S45, if there is no preceding vehicle, the processing proceeds to step S59.

In step S59, the planning unit 134 reads the evacuation space map accumulated in the evacuation space mapping unit 234 via the situation prediction unit 154.

In step S60, the planning unit 134 specifies, on the basis of the evacuation space map, an evacuation space that is farther than the distance that allows for safe pulling over within the braking distance of the own vehicle, is the nearest, and allows for securing a width for the emergency vehicle.

More specifically, the planning unit 134 searches for evacuation space candidate regions on the basis of the evacuation space map, and specifies, from among the evacuation space candidate regions found in the search, an evacuation space that is farther than the distance that allows for safe pulling over within the braking distance of the own vehicle, is the nearest, and allows for securing a width for the emergency vehicle.

Then, the processing proceeds to step S51.

That is, if there is no preceding vehicle, the evacuation space map is immediately read and specification of an evacuation space is started.

By the above processing, if it is determined that emergency evacuation is necessary due to an approaching emergency vehicle, the travel mode transitions from the normal mode to the evacuation mode, and if there is a preceding vehicle, the vehicle travels following the preceding vehicle.

Then, in a case where traveling following the preceding vehicle has continued for the predetermined time or more, or in a case where the preceding vehicle has stopped traveling, the evacuation space map is read, an evacuation space is specified, a route with the specified evacuation space as a destination is planned, and operation control for traveling the planned route is performed.

Furthermore, in a case where there is no preceding vehicle, the evacuation space map is immediately read, an evacuation space is specified, a route with the specified evacuation space as a destination is planned, and operation control for traveling the planned route is performed.

Moreover, in a case where an evacuation space cannot be specified, the traveling is continued until an evacuation space is detected.

As a result, in a case where an approaching emergency vehicle is recognized, it is possible to secure safety and pull over the vehicle to an evacuation space while clearing the traveling lane for the emergency vehicle.

Note that, in the above description, an example has been described in which, in a case where there is a preceding vehicle, the vehicle travels following the preceding vehicle. Alternatively, even in a case where there is a preceding vehicle, in a case where it is possible to immediately read the evacuation space map and specify an evacuation space short of the preceding vehicle, the vehicle may be pulled over to the specified evacuation space to clear the traveling lane for the emergency vehicle.

Furthermore, in the above description, an example has been described in which, when an approaching emergency vehicle is detected, the vehicle enters the evacuation mode, specifies an evacuation space, and pulls over to the specified evacuation space as the emergency evacuation processing. However, in a case where the emergency vehicle approaches too soon so that the emergency vehicle travels in the traveling lane and passes by at a stage in which the vehicle is only moving to the evacuation space and has not arrived at the evacuation space yet, the mode may be returned to the normal mode before the vehicle pulls over.

That is, in such a case, in a case where the emergency vehicle passes too soon, the vehicle may only enter the evacuation space as the emergency evacuation processing without pulling over, and then return to the normal mode.

Furthermore, for example, in a case where the vehicle has cleared the traveling lane for the emergency vehicle and moved to the region Z51, which is an evacuation space candidate region, and the region Z51 includes a traveling lane of a sufficient size as illustrated in FIG. 15, the vehicle may continue traveling in a state where the speed is reduced to a predetermined speed at which safety in the traveling lane can be secured while evacuating to the region Z51.

Moreover, in the above description, an example has been described in which the emergency evacuation processing is executed in a case where an emergency vehicle is approaching the own vehicle from behind the own vehicle. However, the emergency evacuation processing may also be executed in a case where another type of emergency occurs.

For example, emergency evacuation processing for pulling over the vehicle to an evacuation space may be executed in the event of an unexpected situation of a driver or a passenger, such as a case where dozing driving of the driver has been detected, a case where the driver or the passenger feels unwell, a case where medical data such as a heart rate is detected and a deterioration in physical condition is detected from the detected medical data, and a case where a user declares an emergency.

Furthermore, emergency evacuation processing for pulling over the own vehicle to an evacuation space may be executed in a case where an abnormality in the state of the own vehicle such as a punctured tire, an engine trouble, or a sensor failure has been detected.

Moreover, in a case where a dangerous object or a fallen object is detected ahead of the own vehicle and may cause a collision, emergency evacuation processing for pulling over the own vehicle to an evacuation space may be performed for damage mitigation.

Here, in a case where the own vehicle is traveling straight even though a user, who is the driver, has found a dangerous object or a fallen object ahead of the own vehicle, the user, who is the driver, may issue an evacuation instruction to implement emergency evacuation processing.

Furthermore, in a case where a user, who is the driver, intentionally pulls over the own vehicle in order to have a rendezvous with a following vehicle or pick up a person, the user, who is the driver, may issue an evacuation instruction to implement emergency processing.

Moreover, an evacuation space map may be shared by a plurality of vehicles in such a way that information from the plurality of vehicles is managed by a server or cloud computing via a network and accumulated over time by the plurality of vehicles.

3. Example of Execution by Software

Incidentally, the series of pieces of processing described above can be executed not only by hardware but also by software. In a case where the series of pieces of processing is executed by software, a program constituting the software is installed from a recording medium into a computer built into dedicated hardware, a general-purpose computer or the like capable of executing various functions with various programs installed therein, or the like.

Figure 20:
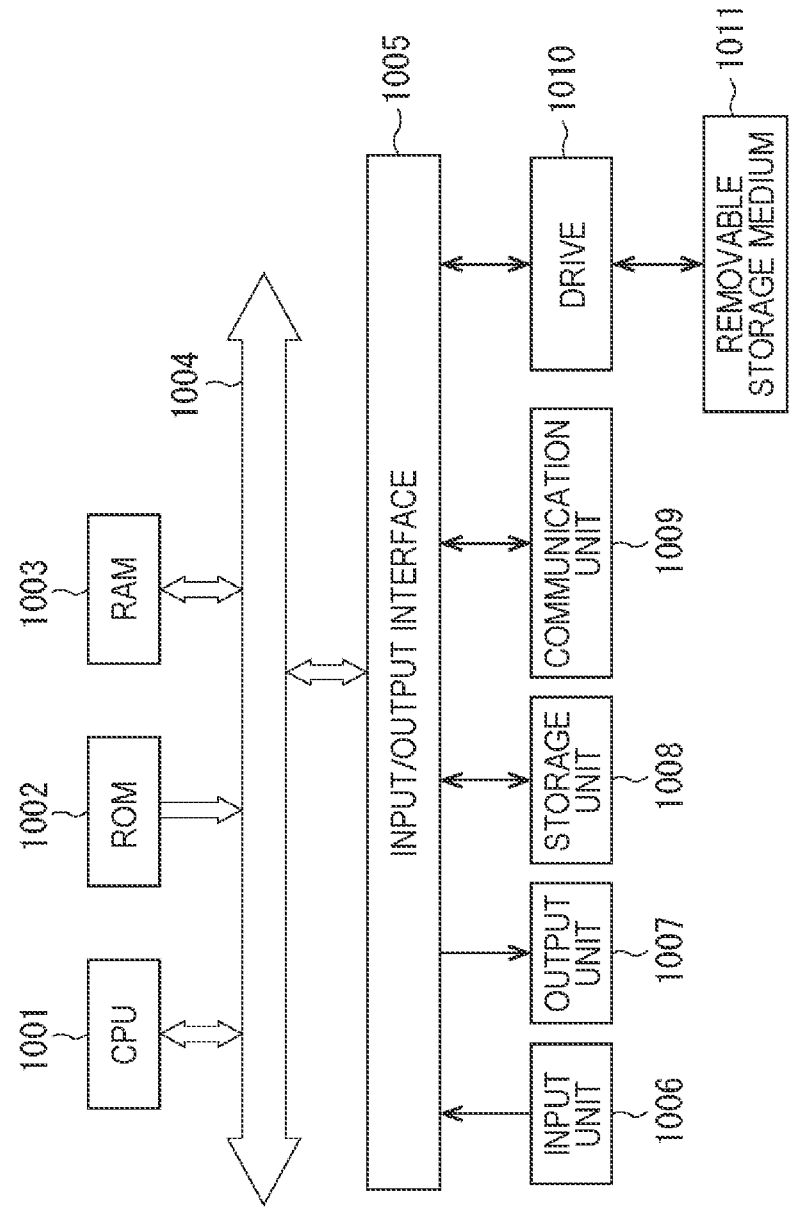
FIG. 20 is a diagram illustrating a configuration example of a general-purpose computer.

FIG. 20 illustrates a configuration example of the general-purpose computer. This personal computer has a built-in central processing unit (CPU) 1001. The CPU 1001 is connected with an input/output interface 1005 via a bus 1004. The bus 1004 is connected with a read only memory (ROM) 1002 and a random access memory (RAM) 1003.

The input/output interface 1005 is connected with an input unit 1006, an output unit 1007, a storage unit 1008, and a communication unit 1009. The input unit 1006 includes an input device such as a keyboard and a mouse used by a user to input an operation command. The output unit 1007 outputs a processing operation screen and an image of a processing result to a display device. The storage unit 1008 includes a hard disc drive or the like for storing programs and various types of data. The communication unit 1009 includes a local area network (LAN) adapter or the like and executes communication processing via a network as represented by the Internet. Furthermore, the input/output interface 1005 is connected with a drive 1010 that reads and writes data from and to a removable medium 1011 such as a magnetic disc (including a flexible disc), an optical disc (including a compact disc-read only memory (CD-ROM) and a digital versatile disc (DVD)), a magneto-optical disc (including Mini Disc (MD)), or a semiconductor memory.

The CPU 1001 executes various types of processing according to a program stored in the ROM 1002 or a program that is read from the removable medium 1011 such as a magnetic disc, an optical disc, a magneto-optical disc, or a semiconductor memory, installed in the storage unit 1008, and loaded from the storage unit 1008 into the RAM 1003. The RAM 1003 also stores, as appropriate, data or the like necessary for the CPU 1001 to execute various types of processing.

To perform the series of pieces of processing described above, the computer configured as described above causes the CPU 1001 to, for example, load a program stored in the storage unit 1008 into the RAM 1003 via the input/output interface 1005 and the bus 1004 and then execute the program.

The program to be executed by the computer (CPU 1001) can be provided by, for example, being recorded on the removable medium 1011 as a package medium or the like. Furthermore, the program can be provided via a wired or wireless transmission medium such as a local area network, the Internet, or digital satellite broadcasting.

Inserting the removable medium 1011 into the drive 1010 allows the computer to install the program into the storage unit 1008 via the input/output interface 1005. Furthermore, the program can be received by the communication unit 1009 via a wired or wireless transmission medium and installed into the storage unit 1008. In addition, the program can be installed in advance in the ROM 1002 or the storage unit 1008.

Note that the program to be executed by the computer may be a program that performs the pieces of processing in chronological order as described in the present specification, or may be a program that performs the pieces of processing in parallel or when needed, for example, when the processing is called.

Note that the CPU 1001 in FIG. 20 implements a function of the automated driving control unit 112 in FIG. 5. Furthermore, the storage unit 1008 in FIG. 20 serves as the storage unit 111 in FIG. 5.

Furthermore, in the present specification, a system means a set of a plurality of components (devices, modules (parts), and the like), and it does not matter whether or not all components are in the same housing. Thus, a plurality of devices housed in separate housings and connected via a network, and one device having a plurality of modules housed in one housing are both systems.

Note that embodiments of the present disclosure are not limited to the embodiments described above, and can be modified in various ways within a scope of the present disclosure.

For example, the present disclosure can have a cloud computing configuration in which a plurality of devices shares one function and collaborates in processing via a network.

Furthermore, each step described in the flowcharts described above can be executed by one device or can be shared by a plurality of devices.

Moreover, in a case where a plurality of pieces of processing is included in one step, the plurality of pieces of processing included in that step can be executed by one device or can be shared by a plurality of devices.

Note that the present disclosure can also be configured as described below.

<1> An information processing apparatus including:
  a distance information acquisition unit that acquires distance information;
  an image acquisition unit that acquires an image;
  an image attribute recognition unit that recognizes an attribute of each region in the acquired image as image attribute information; and
  an evacuation space map creation unit that creates an evacuation space map, which is a map constituted by an evacuation space available for a vehicle to safely evacuate, on the basis of the distance information and the image attribute information,
  in which the evacuation space map creation unit creates the evacuation space map by setting a travelable region available for the vehicle to travel on the basis of the distance information, and setting the evacuation space in the travelable region in accordance with a situation of a road surface of the travelable region based on the image attribute information.

<2> The information processing apparatus according to <1>, in which
  the evacuation space map creation unit creates the evacuation space map by setting the travelable region available for the vehicle to travel on the basis of the distance information, and then setting the evacuation space in the travelable region in accordance with the situation of the road surface of the travelable region based on the image attribute information.

<3> The information processing apparatus according to <2>, in which
  the evacuation space map creation unit creates the evacuation space map by setting a region available for the vehicle to safely evacuate and a region unavailable for the vehicle to safely evacuate in the travelable region in accordance with the situation of the road surface of the travelable region based on the image attribute information in the travelable region, and setting the region available for the vehicle to safely evacuate as the evacuation space.

<4> The information processing apparatus according to <3>, in which
  the evacuation space map creation unit sets a polar coordinate grid for information in which the distance information and the image attribute information are superimposed, and creates the evacuation space map for each horizontal angle region in the polar coordinate grid.

<5> The information processing apparatus according to <3>, in which
  the evacuation space map creation unit sequentially accumulates over time the created evacuation space maps in association with a self-position.

<6> The information processing apparatus according to any one of <1> to <5>, further including:
  an evacuation mode setting unit that sets an evacuation mode in response to occurrence of an emergency; and
  a planning unit that plans an operation of the vehicle,
  in which the planning unit plans the operation of the vehicle on the basis of the evacuation space map in a case where the evacuation mode is set.

<7> The information processing apparatus according to <6>, in which
  the planning unit searches for the evacuation space on the basis of the evacuation space map, and plans an operation for pulling over the vehicle to the evacuation space found in the search.

<8> The information processing apparatus according to <6>, in which
  the planning unit searches for the evacuation space that is farther than a braking distance of the vehicle and is nearest on the basis of the evacuation space map, and plans an operation for pulling over the vehicle to the evacuation space found in the search.

<9> The information processing apparatus according to <6>, in which
  in a case where the emergency is an emergency vehicle approaching from behind, the planning unit searches for the evacuation space on the basis of the evacuation space map after decelerating the vehicle to a predetermined speed, and plans an operation for pulling over the vehicle to the evacuation space found in the search.

<10> The information processing apparatus according to <6>, in which
  in a case where the emergency is an emergency vehicle approaching from behind, the planning unit searches for the evacuation space on the basis of the evacuation space map, and plans an operation for pulling over the vehicle to the evacuation space constituted by a road shoulder of a traveling lane in such a way as to clear the traveling lane for the emergency vehicle in a case where a width of the evacuation space found in the search is larger than a width obtained by adding a width of the vehicle and a width of the emergency vehicle.

<11> The information processing apparatus according to <6>, in which
  the planning unit searches for the evacuation space on the basis of the evacuation space map, and plans an operation for causing the vehicle to continue traveling in a case where the search for the evacuation space fails.

<12> The information processing apparatus according to <6>, in which
  in a case where the emergency is an emergency vehicle approaching from behind, the planning unit searches for the evacuation space on the basis of the evacuation space map, and plans an operation for causing the vehicle to continue traveling in a case where a width of the evacuation space found in the search is not larger than a total width of the vehicle and the emergency vehicle.

<13> The information processing apparatus according to <6>, in which
  in a case where there is a preceding vehicle, the planning unit plans an operation for causing the vehicle to travel following the preceding vehicle while ensuring safety with the preceding vehicle.

<14> The information processing apparatus according to <13>, in which
  in a case where there is a preceding vehicle, the planning unit plans an operation for pulling over the vehicle to the evacuation space that is short of the preceding vehicle, is farther than a braking distance of the vehicle, and is nearest on the basis of the evacuation space map in a case where a state where the vehicle is operated to travel following the preceding vehicle while ensuring safety with the preceding vehicle continues for a predetermined time.

<15> The information processing apparatus according to <6>, in which
  the emergency includes a case where an emergency vehicle is approaching from behind, a case where drowsy driving of a driver has been detected, a case where the driver or a passenger feels unwell, a case where a deterioration in physical condition of the driver is detected from medical data including a heart rate of the driver, a case where the driver declares an emergency, a case where an unexpected situation occurs in the driver or the passenger, a case where an abnormality is detected in a state of the vehicle, a case where a dangerous object or a fallen object is detected ahead of the vehicle and there is a possibility of a collision, and a case where the driver intentionally pulls over the own vehicle to have a rendezvous with a following vehicle or pick up a person.

<16> The information processing apparatus according to any one of <1> to <15>, in which
  the image attribute recognition unit recognizes an attribute in units of pixels in the acquired image as image attribute information by semantic segmentation.

<17> The information processing apparatus according to any one of <1> to <16>, in which
  the image acquisition unit acquires the image captured by an infrared light camera.

<18> The information processing apparatus according to any one of <1> to <16>, in which
  the image acquisition unit acquires the image captured by a polarization camera.

<19> An information processing method including:
distance information acquisition processing of acquiring distance information;
image acquisition processing of acquiring an image;
image attribute recognition processing of recognizing an attribute of each region in the acquired image as image attribute information; and
evacuation space map creation processing of creating an evacuation space map, which is a map constituted by an evacuation space available for a vehicle to safely evacuate, on the basis of the distance information and the image attribute information,
in which the evacuation space map creation processing creates the evacuation space map by setting a travelable region available for the vehicle to travel on the basis of the distance information, and setting the evacuation space in the travelable region in accordance with a situation of a road surface of the travelable region based on the image attribute information.

<20> A program that causes a computer to function as:
a distance information acquisition unit that acquires distance information;
an image acquisition unit that acquires an image;
an image attribute recognition unit that recognizes an attribute of each region in the acquired image as image attribute information; and
an evacuation space map creation unit that creates an evacuation space map, which is a map constituted by an evacuation space available for a vehicle to safely evacuate, on the basis of the distance information and the image attribute information,
in which the evacuation space map creation unit creates the evacuation space map by setting a travelable region available for the vehicle to travel on the basis of the distance information, and setting the evacuation space in the travelable region in accordance with a situation of a road surface of the travelable region based on the image attribute information.

REFERENCE SIGNS LIST

100 Vehicle control system
102 Data acquisition unit
106 Output unit
111 Storage unit
112 Automated driving control unit
131 Detection unit
132 Self-position estimation unit
133 Situation analysis unit
134 Planning unit
135 Operation control unit
141 Outside-vehicle information detection unit
151 Map analysis unit
152 Traffic rule recognition unit
153 Situation recognition unit
154 Situation prediction unit
201 Camera
202 Depth sensor
203 GPS
211 Vehicle detection unit
212 Attribute recognition unit
213 Depth sensing unit
231 Emergency vehicle identification unit
232 Vehicle tracking unit
233 Polar coordinate grid processing unit
234 Evacuation space mapping unit

The invention claimed is:

1. An information processing apparatus, comprising:
a central processing unit (CPU) configured to:
acquire distance information, wherein the distance information is associated with a depth image from a depth sensor;
acquire an image from an imaging device;
determine, as image attribute information, an attribute of each region of a plurality of regions in the acquired image,
wherein the image attribute information indicates a situation of a road surface in each region of the plurality of regions;
acquire a travelable region available for a vehicle to travel;
superimpose the acquired distance information on the image attribute information;
set a plurality of evacuation spaces in the travelable region based on the image attribute information,
wherein the plurality of evacuation spaces is for evacuation of the vehicle;
generate an evacuation space map based on the plurality of evacuation spaces set in the travelable region and the superimposition of the acquired distance information on the image attribute information,
wherein the generated evacuation space map indicates the plurality of evacuation spaces;
determine occurrence of an emergency;
determine, based on the occurrence of the emergency, the vehicle follows a preceding vehicle for a specific time;
search for an evacuation space of the plurality of evacuation spaces based on the generated evacuation space map and the determination that the vehicle follows the preceding vehicle for the specific time,
wherein the evacuation space among the plurality of evacuation spaces is short of the preceding vehicle, is farther than a braking distance of the vehicle, and is nearest to the vehicle;
plan a route with the evacuation space as a destination;
control the vehicle to travel along the route with the evacuation space as the destination;
plan, based on the control of the vehicle and the determination that the vehicle follows the preceding vehicle for the specific time, a first operation to pull over the vehicle to the evacuation space as the destination;
re-plan the route to an original destination in a case where the emergency is over; and
control the vehicle to travel along the re-planned route to the original destination.

2. The information processing apparatus according to claim 1, wherein the CPU is further configured to:
set, in the travelable region, first region available for the vehicle to safely evacuate and a second region unavailable for the vehicle to safely evacuate, wherein the first region and the second region are set based on the image attribute information;
set the first region as the evacuation space; and
generate the evacuation space map that indicates the first region and the second region.

3. The information processing apparatus according to claim 2, wherein the CPU is further configured to:
set a polar coordinate grid for information in which the acquired distance information is superimposed on the image attribute information, wherein the polar coordinate grid includes a plurality of horizontal angle regions; and
generate the evacuation space map for each horizontal angle region of the plurality of horizontal angle regions.

4. The information processing apparatus according to claim 2, wherein the CPU is further configured to sequentially accumulate over time the generated evacuation space map in association with a position of the vehicle.

5. The information processing apparatus according to claim 1, wherein the CPU is further configured to:
set an evacuation mode based on the occurrence of the emergency; and
plan the first operation based on the set evacuation mode.

6. The information processing apparatus according to claim 5, wherein in a case where the emergency is an emergency vehicle that approaches the vehicle from behind, the CPU is further configured to search for the evacuation space after deceleration of the vehicle to a specific speed.

7. The information processing apparatus according to claim 5, wherein in a case where the emergency is an emergency vehicle that approaches the vehicle from behind and a width of the evacuation space is larger than a width obtained by addition of a width of the vehicle and a width of the emergency vehicle, the CPU is further configured to
plan the first operation to pull over the vehicle to the evacuation space constituted by a road shoulder of a traveling lane, in such a way as to clear the traveling lane for the emergency vehicle.

8. The information processing apparatus according to claim 5, wherein the CPU is further configured to plan a second operation to control the vehicle to continue traveling in a case where the search for the evacuation space fails.

9. The information processing apparatus according to claim 5, wherein the CPU is further configured to plan a second operation to control the vehicle to continue traveling in a case where the emergency is an emergency vehicle that approaches the vehicle from behind and a width of the evacuation space is not larger than a width obtained by addition of a width of the vehicle and a width of the emergency vehicle.

10. The information processing apparatus according to claim 5, wherein the CPU is further configured to plan a second operation to control the vehicle to follow the preceding vehicle with a specific distance from the preceding vehicle.

11. The information processing apparatus according to claim 5, wherein
the emergency includes at least one of a case where an emergency vehicle approaches the vehicle from behind, a case where drowsy driving of a driver is detected, a case where the driver or a passenger is unwell, a case where a deterioration in a physical condition of the driver is detected from medical data including a heart rate of the driver, a case where the driver declares the emergency, a case where an unexpected situation of the driver or the passenger occurs, a case where an abnormality is detected in a state of the vehicle, a case where a dangerous object or a fallen object is detected ahead of the vehicle and there is a possibility of a collision, or a case where the driver intentionally pulls over the vehicle to one of pick up a person or have a rendezvous with a following vehicle.

12. The information processing apparatus according to claim 1, wherein the CPU is further configured to determine, by semantic segmentation, the attribute in units of pixels in the acquired image as the image attribute information.

13. The information processing apparatus according to claim 1, wherein the CPU is further configured to acquire the image from an infrared light camera.

14. The information processing apparatus according to claim 1, wherein the CPU is further configured to acquire the image from a polarization camera.

15. The information processing apparatus according to claim 1, wherein the CPU is further configured to set the travelable region based on the acquired distance information.

16. The information processing apparatus according to claim 1, wherein the CPU is further configured to:
detect a frozen road surface region based on the acquired image;
determine the attribute representing whether each region of the plurality of regions in the acquired image is the frozen road surface region; and
specify, as the evacuation space for the evacuation of the vehicle, a region of the plurality of regions that is not the frozen road surface region.

17. An information processing method, comprising:
acquiring distance information, wherein the distance information is associated with a depth image from a depth sensor;
acquiring an image from an imaging device;
determining, as image attribute information, an attribute of each region of a plurality of regions in the acquired image,
wherein the image attribute information indicates a situation of a road surface in each region of the plurality of regions;
acquiring a travelable region available for a vehicle to travel;
superimposing the acquired distance information on the image attribute information;
setting a plurality of evacuation spaces in the travelable region based on the image attribute information,
wherein the plurality of evacuation spaces is for evacuation of the vehicle;
generating an evacuation space map based on the plurality of evacuation spaces set in the travelable region and the superimposition of the acquired distance information on the image attribute information,
wherein the generated evacuation space map indicates the plurality of evacuation spaces;
determining occurrence of an emergency;
determining, based on the occurrence of the emergency, the vehicle follows a preceding vehicle for a specific time;
searching for an evacuation space of the plurality of evacuation spaces based on the generated evacuation space map and the determination that the vehicle follows the preceding vehicle for the specific time,
wherein the evacuation space among the plurality of evacuation spaces is short of the preceding vehicle, is farther than a braking distance of the vehicle, and is nearest to the vehicle;
planning a route with the evacuation space as a destination;
controlling the vehicle to travel along the route with the evacuation space as the destination;
planning, based on the control of the vehicle and the determination that the vehicle follows the preceding vehicle for the specific time, an operation to pull over the vehicle to the evacuation space as the destination;
re-planning the route to an original destination in a case where the emergency is over; and controlling the vehicle to travel along the re-planned route to the original destination.

18. A non-transitory computer-readable medium having stored thereon, computer-executable instructions which, when executed by a computer, cause the computer to execute operations, the operations comprising:

acquiring distance information, wherein the distance information is associated with a depth image from a depth sensor;

acquiring an image from an imaging element;

determining, as image attribute information, an attribute of each region of a plurality of regions in the acquired image,
  wherein the image attribute information indicates a situation of a road surface in each region of the plurality of regions;

acquiring a travelable region available for a vehicle to travel;

superimposing the acquired distance information on the image attribute information;

setting a plurality of evacuation spaces in the travelable region based on the image attribute information,
  wherein the plurality of evacuation spaces is for evacuation of the vehicle;

generating an evacuation space map based on the plurality of evacuation spaces set in the travelable region and the superimposition of the acquired distance information on the image attribute information,
  wherein the generated evacuation space map indicates the plurality of evacuation spaces;

determining occurrence of an emergency;

determining, based on the occurrence of the emergency, the vehicle follows a preceding vehicle for a specific time;

searching for an evacuation space of the plurality of evacuation spaces based on the generated evacuation space map and the determination that the vehicle follows the preceding vehicle for the specific time,
  wherein the evacuation space among the plurality of evacuation spaces is short of the preceding vehicle, is farther than a braking distance of the vehicle, and is nearest to the vehicle;

planning a route with the evacuation space as a destination;

controlling the vehicle to travel along the route with the evacuation space as the destination;

planning, based on the control of the vehicle and the determination that the vehicle follows the preceding vehicle for the specific time, an operation to pull over the vehicle to the evacuation space as the destination;

re-planning the route to an original destination in a case where the emergency is over; and controlling the vehicle to travel along the re-planned route to the original destination.

* * * * *